(12) United States Patent
Speicher

(10) Patent No.: US 6,243,375 B1
(45) Date of Patent: Jun. 5, 2001

(54) INTERNET-AUDIOTEXT ELECTRONIC COMMUNICATIONS SYSTEM WITH MULTIMEDIA BASED MATCHING

(76) Inventor: Gregory J. Speicher, 651F Lakeview Plaza Blvd., Worthington, OH (US) 43085

( * ) Notice: Subject to any disclaimer, the term of this patent is extended or adjusted under 35 U.S.C. 154(b) by 0 days.

(21) Appl. No.: 08/865,241

(22) Filed: May 29, 1997

Related U.S. Application Data

(63) Continuation-in-part of application No. 08/744,879, filed on Nov. 8, 1996, now abandoned.

(51) Int. Cl.[7] .................................................. H04L 12/66

(52) U.S. Cl. .......................... 370/352; 370/901; 370/259; 705/1; 705/14

(58) Field of Search ..................................... 320/352, 353, 320/354, 901; 455/2, 3.1, 3.3, 6.3, 406; 340/825.33; 705/1, 14, 24

(56) References Cited

U.S. PATENT DOCUMENTS

| | | | |
|---|---|---|---|
| 5,504,675 | * | 4/1996 | Cragun .......................... 340/825.33 |
| 5,515,098 | * | 5/1996 | Carles ................................. 455/3.3 |
| 5,636,346 | * | 6/1997 | Saxe ...................................... 455/2 |
| 5,848,396 | * | 12/1998 | Gerace ................................. 455/6.2 |

* cited by examiner

*Primary Examiner*—Douglas Olms
*Assistant Examiner*—Ricardo M. Pizarro
(74) *Attorney, Agent, or Firm*—Ward & Olivo

(57) ABSTRACT

The present invention relates to an electronic advertising system. More specifically, the present invention provides a computer based psychographic matching system that is significantly more effective and convenient for the advertiser. In the present invention, when a person places a personal ad on the system, either via a telephone or via the Internet, the person creates a personal psychographic profile (a subjective makeup of preferences) of himself by selecting his preference for various items, such as musical pieces, environmental sounds, poetry selections, etc. At the conclusion of the profiling process, the system automatically finds other advertisers (whether they placed their ad via audiotext or the Internet) whose profiles match the new advertiser's profile. The system then gives the new advertiser information on how to contact all of the recorded matches.

14 Claims, 14 Drawing Sheets

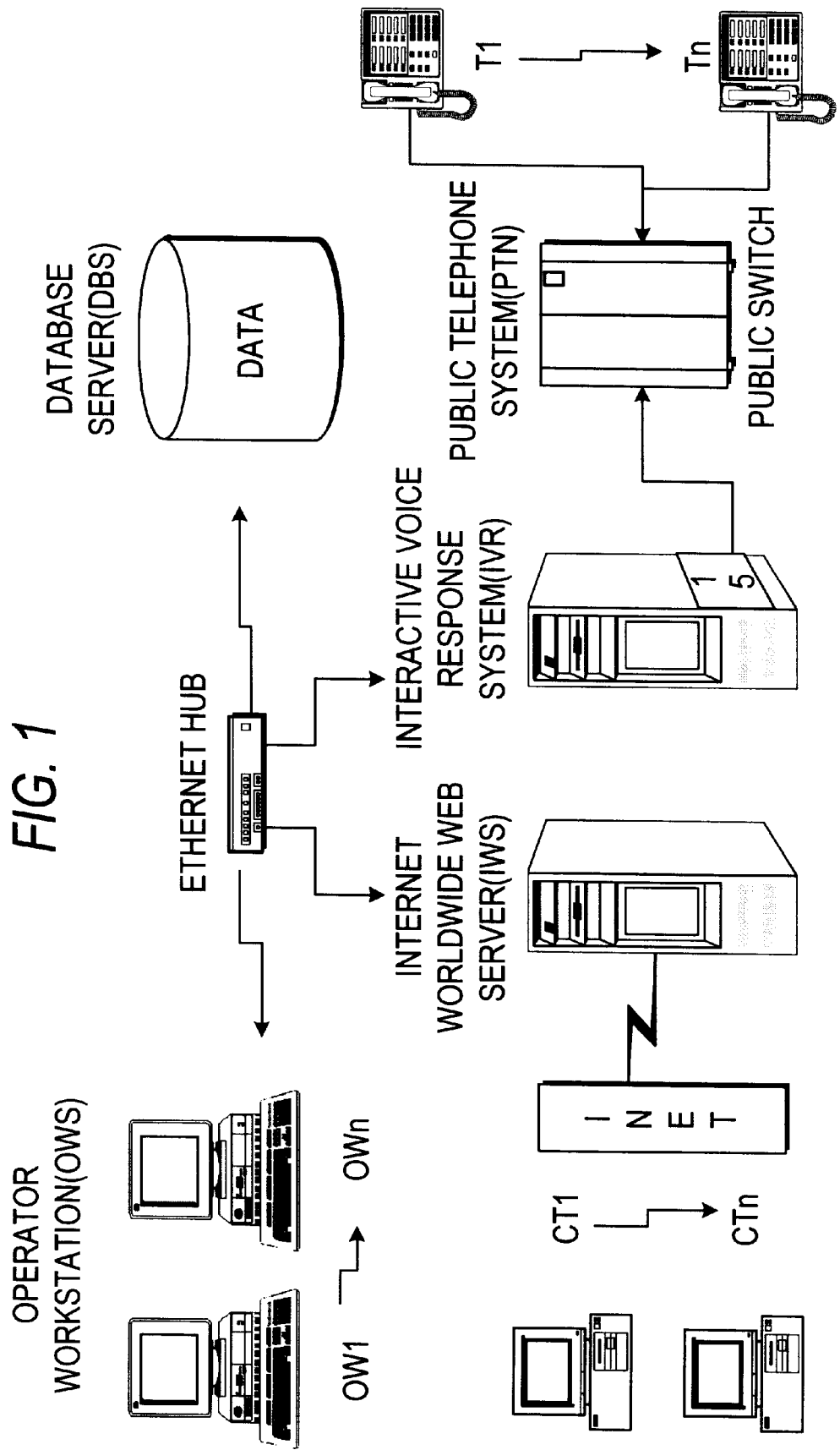

FIG. 2
AD PERSONAL TABLE

| FIELD NAME | REF. # | DESCRIPTION |
|---|---|---|
| AD_MAILBOX_NUMBER | 201 | THE FIVE DIGIT MAILBOX NUMBER ASSIGNED TO AN ADVERTISER. THE MAILBOX NUMBER IS USED AS AN ELECTRONIC MAILBOX FOR MULTIMEDIA RESPONSES. |
| AD_PASSWORD | 202 | AN ADVERTISER'S 5 DIGIT PASSWORD |
| AD_PHONE | 203 | AN ADVERTISER'S PHONE NUMBER |
| AD_EMAIL_ADDRESS | 204 | THE ELECTRONIC MAILBOX ADDRESS OF AN ADVERTISER. |
| AD_EMAIL_FILENAME | 205 | THE FILENAME OF THE E-MAIL AUDIO FILE RECEIVED FROM AN ADVERTISER |
| AD_DATE | 206 | THE DATE AN AD IS PLACED |
| AD_GENDER | 207 | THE GENDER OF AN ADVERTISER |
| AD_MARITAL_STATUS | 208 | THE MARITAL STATUS OF AN ADVERTISER |
| AD_AGE | 209 | THE AGE OF AN ADVERTISER |
| AD_REVIEW_FLAG | 210 | SET TO FALSE TO INDICATE THAT AN AD NEEDS TO BE REVIEWED. |
| AD_ORIGIN | 211 | INDICATES IF AD ORIGINATES ON THE IVR OR THE IWS |
| AD_PSYCH_PROFILE | 212 | INDICATE THE PSYCHOGRAPHIC PROFILE OF AN ADVERTISER |

FIG. 3
AD GREETINGS TABLE

| FIELD NAME | REF. # | DESCRIPTION |
|---|---|---|
| GR_MAILBOX_NUMBER | 301 | THE FIVE DIGIT MAILBOX NUMBER ASSIGNED TO AN AD. |
| GR_TYPE | 302 | THE TYPE OF GREETING STORED (TEXT, VOX, WAV, REALAUDIO, PHOTO, ETC..). |
| GR_REVIEW_FLAG | 303 | THE FLAG DENOTES IF A FILE HAS BEEN REVIEWED. |
| GR_FILENAME | 304 | THE FILENAME OF A GREETING. |
| GR_DATE_TIME | 305 | DATE AND TIME A GREETING IS POSTED TO THE DATABASE. |
| GR_CONVERSION_FLAG | 306 | SET TO FALSE IF A FILE REQUIRES CONVERSION TO ANOTHER FORMAT. |

FIG. 4
AD RESPONSE TABLE

| FIELD NAME | REF. # | DESCRIPTION |
|---|---|---|
| RSP_MAILBOX_NUMBER | 501 | THE FIVE DIGIT MAILBOX NUMBER OF THE AD RESPONDED TO. |
| RSP_DATE_TIME | 503 | THE DATE AND TIME A RESPONSE IS MADE. |
| RSP_TYPE | 504 | THE TYPE OF RESPONSE FILE (TEXT, VOX, WAV, REALAUDIO, ETC..). |
| RSP_FILENAME | 505 | THE FILENAME OF A RESPONSE. |
| RSP_CONVERSION_FLAG | 506 | SET TO FALSE IF A FILE REQUIRES CONVERSION TO ANOTHER FORMAT. |

FIG. 8

OUTGOING AND FUN    87654

I AM A SINGLE WHITE FEMALE, AGE 25, WHO ENJOYS MOVIES, DINING OUT, TRAVEL AND THE OUTDOORS. I WORK AS A SECRETARY AT A LAW OFFICE AND LOVE MY JOB. I'M LOOKING FOR AN ATTRACTIVE SINGLE WHITE MALE, AGE 25 TO 30, FOR FRIENDSHIP AND POSSIBLE ROMANCE.

 2001

 2004

URBAN COWBOY    67672

I AM A SINGLE WHITE MALE WHO LOVES COUNTRY MUSIC AND THE OUTDOORS. I HAVE A SMALL HORSE FARM OUTSIDE OF TOWN I WOULD LOVE TO SHOW THAT SPECIAL SOMEONE. I ALSO ENJOY COOKING, HIKING, SWIMMING, AND TENNIS. I'M LOOKING FOR SOMEONE WITH SIMILAR INTERESTS.

2003

NICE GUYS FINISH FIRST    45378

I AM A DIVORCED BLACK MALE, AGE 40, AND AM NEW TO THE AREA. I WAS RECENTLY TRANSFERRED HERE BY MY COMPANY AND AM LOOKING FOR A NEW FRIEND. I'M SEEKING A NICE BLACK FEMALE WHO CAN SHOW ME AROUND.

2002

 2005

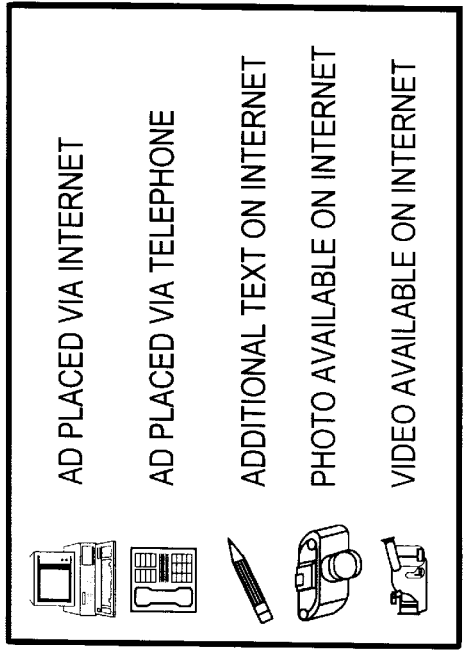

AD PLACED VIA INTERNET

AD PLACED VIA TELEPHONE

ADDITIONAL TEXT ON INTERNET

PHOTO AVAILABLE ON INTERNET

VIDEO AVAILABLE ON INTERNET

INTERNET-AUDIOTEXT ELECTRONIC COMMUNICATIONS SYSTEM WITH MULTIMEDIA BASED MATCHING

CROSS-REFERENCE TO RELATED APPLICATIONS

This application is a continuation-in-part of application Ser. No. 08/744,879, filed Nov. 8, 1996, now abandoned.

TECHNICAL FIELD OF THE INVENTION

The present invention relates to audiotext systems designed to provide full access to traditional databases and telecommunications systems, such as local area networks, the Internet, other external databases, telephones and fax machines, etc., and more specifically to audiotext personal ad services.

BACKGROUND OF THE INVENTION

Audiotext personal ad services are a popular way for people to meet, and are available in most newspapers and on many cable television systems. In a typical service, an advertiser calls a live operator and places a text personal ad. An advertiser then calls an audiotext system and records an audio message, often referred to as a greeting, which expands upon the advertiser's text ad by describing in more detail the advertiser and the type of person he is seeking. Personal ads are then published in a newspaper. A personal ad includes a 900 telephone number and an ad mailbox number permitting a caller to listen to an advertiser's voice greeting. A caller can respond to an ad by recording a reply voice mail message for the advertiser. An advertiser retrieves a message by calling the audiotext system and entering a password given at the time of ad placement. In another format, live operators are not used. Instead, an advertiser first records an audio greeting via telephone. An operator then listens to the audio greeting off-line and writes a text summary of the audio greeting for publication in the newspaper.

With the expansion of the Internet and other on-line services, personal ad services have been created to take advantage of this new medium. A typical service allows an advertiser to place a text personal ad that is published on the Internet on an HyperText Markup Language (HTML) page. An Internet user may respond to a personal ad by sending an advertiser a message via electronic mail. The limitation of this approach is that an Internet user cannot listen to an audio recording of an advertiser, a feature that is the central to audiotext personal ad services. Another limitation is that telephone users cannot exchange messages with Internet users. Another limitation is that many people do not have Internet access, thus limiting the number of advertisers and respondents.

In another format, an attempt is made to integrate audiotext personal ads services with the Internet. Using this approach, a newspaper publishes personal ads in both the newspaper and on the Internet. Each personal ad includes a 900 telephone number and an ad mailbox number permitting a caller to listen to an advertiser's voice greeting. This approach still has the disadvantage of not allowing an Internet user to listen to an advertiser's voice greeting via the Internet. Moreover, an Internet user can only respond to a personal ad via a telephone.

To summarize, existing Internet personal ad services are limited in that they lack many of the features available on audiotext personal ad services. Also, existing personal ad services do not provide a means for those using an audiotext personal ad service to effectively communicate with those using an Internet personal ad service and visa versa. Therefore, there is a need for a personal ad system that seamlessly integrates an audiotext system with an Internet server, allowing straightforward communication between those using a telephone and those on the Internet. Such a system has been proposed in detail by the present inventor which comprises application Ser. No. 08/744,879. However, there is still the need to address some of the problems inherent in an integrated audiotext and Internet based personal ad service.

A basic problem with the prior services is that when a person places an ad, he must wait for his ad to be published and then for someone to respond to it in order to meet someone. Another problem is that if an advertiser wants to meet someone by responding to other personal ads, he must scan a large number of ads to identify a relatively small number of ads that meet his criteria. In addition, if an advertiser does not locate a suitable ad on a given day, the advertiser must in general do a complete search on the following day, since ads are generally not segregated based upon whether they have been newly placed. Moreover, since new ads can be placed both via an audiotext system and via the Internet, the advertiser might need to scan both the audiotext system and the Internet to find new ads. Finally, advertisers are not notified when they receive a response to their ad, thus requiring advertisers to check their mailbox frequently so as not to miss a message.

Because of their popularity, a personal ads service published in a newspaper or cable television system can attract several hundred or more advertisers at any given time. Because of the quantity of ads in a given service, it can be difficult and tedious to search all the ads to find a compatible person. Several attempts have been made to deal with this problem. The most common approach is to match individuals based on demographic criteria such as gender, race, age, religion, etc. One such system has been proposed by the present inventor which comprises application Ser. No. 08/799,537. In spite of the benefits of this type of matching, users of personal ad services continue to seek better and more effective ways of meeting compatible individuals.

The limitation, however, of demographic-based matching is that it does not take into account the subjective, "psychographic", makeup of the individual, such as an individual's preference for visual images (photographs or paintings), writing (prose and poetry), or audio (music, sounds), etc. which are more in line with an individual's personality. Many individuals find compatibility in these areas far more relevant to predicting the success of a relationship than rigid demographic categories, such as race, gender, religion and age. Therefore, there is a need for a personal ad service that incorporates this psychographic profiling in the matching process.

This approach has been used by at least one Internet based personal ad service. In such a service, the Internet user is presented with a series of sets of two photographs in an "A/B" fashion. The user "clicks" on a given photograph to indicate his preference. The series of photographs selected by the user are then stored in a database and used to match the user with other users who selected the same photographs. The limitation of this approach is that there is no way for telephone users to participate, thereby excluding a large percentage of potential matches.

To be effective, a psychographic profiling service must accommodate users of both traditional audiotext-based personal ad services as well as Internet-based personal ad services. Since large numbers of individuals continue to use each type of service on a more or less exclusive basis, failure to integrate the two environments significantly limits the database pool of potential matches.

The current invention accommodates these needs by incorporating a matching feature based on psychographic profiling. Users are asked to indicate their preference for certain individual audio and/or visual elements which are presented in a series. A user's preferences are then stored in a database where they can be used to match with other users. In addition, the present invention allows both telephone and Internet users to take the same psychographic inventory and to match it with the psychographic profile of other individuals regardless of the medium (telephone or Internet) through which they enter the system. The benefit of this invention is that it provides a more powerful basis for matching individuals than has been available in the art while maximizing the pool of potential matches through the deployment of the service on a fully integrated Internet/audiotext platform.

SUMMARY OF THE INVENTION

The present invention relates to an electronic advertising system. More specifically, the present invention provides a computer based psychographic matching system that is significantly more effective and convenient for the advertiser. In the present invention, when a person places a personal ad on the system, either via a telephone or via the Internet, the person creates a personal psychographic profile (a subjective makeup of preferences) of himself by selecting his preference for various items, such as musical pieces, environmental sounds, poetry selections, etc. At the conclusion of the profiling process, the system automatically finds other advertisers (whether they placed their ad via audiotext or the Internet) whose profiles match the new advertiser's profile. In addition, during the ad taking process, a person is asked to input a telephone number and an e-mail address. Thereafter, whenever a new personal ad comes on to the system that matches the person's profile (whether the ad originates on the audiotext system or on the Internet), the person is notified of the new ad and given instructions of how to contact the new match. Also, each time a person responds to a personal ad, the system automatically finds and presents other personal ads with similar characteristics to save the user time in finding an appealing ad. Finally, each time someone responds to a personal ad, the advertiser is automatically notified both via telephone and via electronic mail.

The significant advantages provided by the present invention are apparent from the above description. The present invention provides a more effective means of matching individuals than previous demographic style matching systems. Also, the system of the present invention does not require the advertiser to scan large numbers of ads, or to repeatedly scan for new ads. In addition, new advertisers can meet someone faster because they are automatically matched with other advertisers at the time of ad placement and notified when someone responds to their ad.

BRIEF DESCRIPTION OF DRAWINGS

For a more complete understanding of the present invention, reference is made to the following drawings, in which:

FIG. 1 shows a schematic representation of the present invention.

FIG. 2 shows a table of the fields used for storing personal data, including a brief description of the particular fields.

FIG. 3 shows a table of the fields used for storing greeting data, including a brief description of the particular fields.

FIG. 4 shows a table of the fields used for storing response data, including a brief description of the particular fields.

FIG. 8 shows personal advertisements as they would appear in a local newspaper.

DETAILED DESCRIPTION OF THE PREFERRED EMBODIMENT

Figure 5:
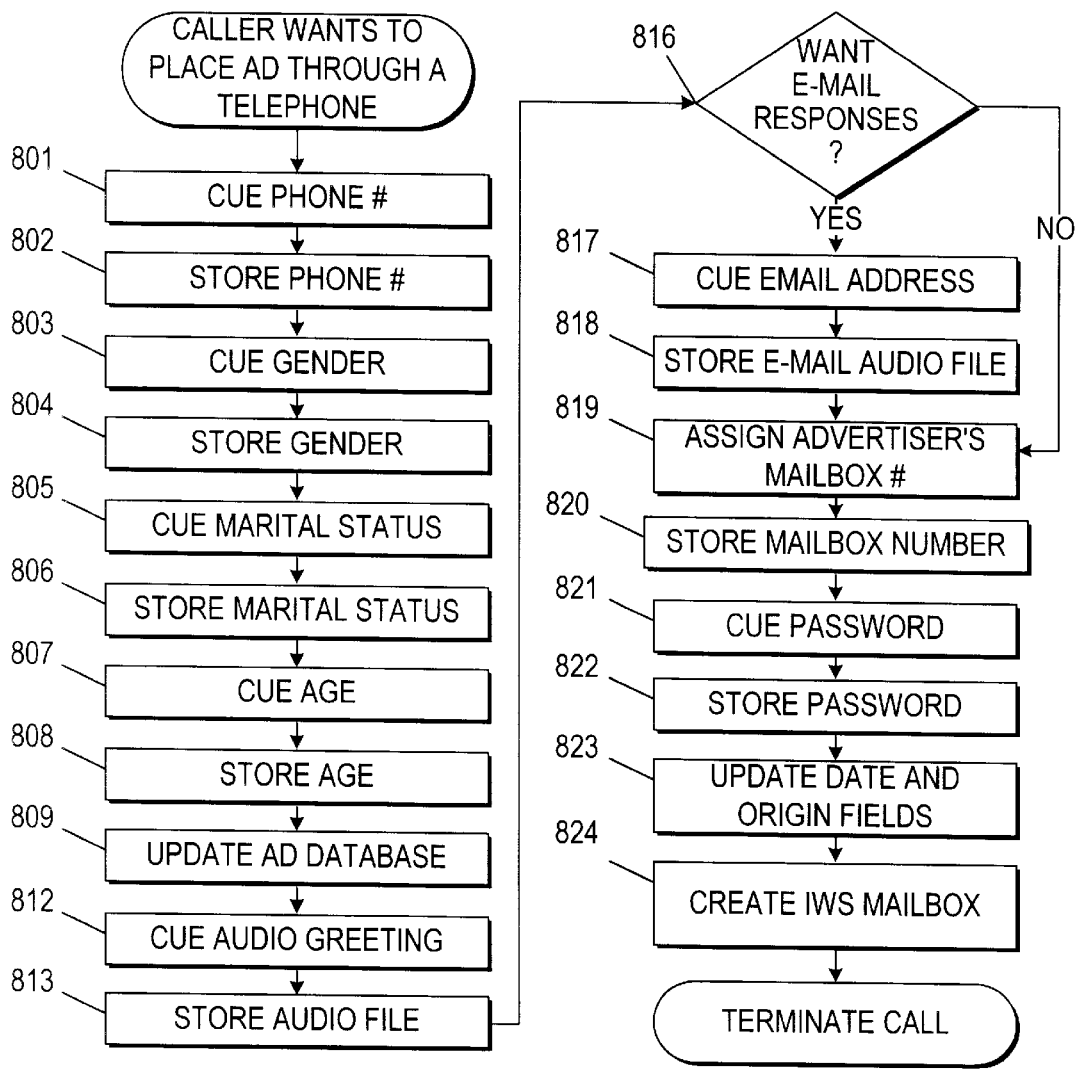
FIG. 5 shows a flow diagram of an exemplary operation of the present invention, more specifically placing an advertisement through a telephone.

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Referring initially to FIG. 1, a series of remote telephone terminals T1–Tn are represented. In addition, a series of remote computer terminals CT1–CTn are represented. The indicated terminals T1–Tn represent the multitude of telephone terminals existing in association with the public telephone network (PTN). The indicated computer terminals CT1–CTn represent the multitude of computer terminals connected to the Internet.

The PTN, which accommodates the individual terminals T1–Tn, is coupled to an Interactive Voice Response System (IVR). The Internet, which accommodates individual computer terminals CT1–CTn, is coupled to an Internet Web Server (IWS). Individual telephone callers use the individual telephone stations T1 through Tn to interface the IVR through the PTN. Individual Internet users at computer terminals CT1 through CTn use the Internet to interface the IWS. Both telephone callers and Internet users may record digital audio messages that can be listened to from any of the remote telephone terminals T1–Tn or from any of the remote computer terminals CT1–CTn. Internet users may leave digital text messages that may be accessed from any of the remote telephone terminals T1–Tn using text-to-speech or from the remote computer terminals CT1–CTn via a computer monitor.

First, considering the system of FIG. 1 in somewhat greater detail, it is to be understood that the PTN has multiplexing capability for individually coupling the terminals T1–Tn to the IVR on request. In the illustrative embodiment of the system, the individual terminals T1–Tn take the form of existing traditional or conventional telephone instruments. It is also to be understood that the Internet has the capability to individually connect the computer terminals CT1–CTn to the IWS. In this illustrative embodiment of the system, the individual computer terminals CT1–CTn take the form of personal computers that comprise a central processing unit CPU, modem, monitor, keyboard, hard drive, sound card, and microphone.

Second, considering the IVR in somewhat greater detail, the PTN is coupled to an IVR (see FIG. 1). In the disclosed embodiment, forty-eight lines are connected to the IVR from the PTN, and, accordingly, the IVR may accommodate up to forty-eight simultaneous calls from the PTN. The IVR contains a processor, an exemplary form of which is an Intel 166 MHz Pentium Processor. The forty-eight lines from the PTN are connected to the processor though an interface 15, an exemplary form of which is a series of commercially available Dialogic (D240SC-T1) cards. The interface incorporates modems, tone decoders, switching mechanisms, and DNIS and ANI capability. The Dialogic card stores audio information in the Dialogic .VOX format.

Generally, DNIS capability is a function of the PTN in order to provide digital data indicating the called number. ANI capability is a similar function whereby the digital data indicates the calling number.

Third, considering the IWS in somewhat greater detail, the IWS is coupled to the Internet via a DS1 line to a local Internet provider service. The IWS may accommodate a multitude of simultaneous Internet users. As represented, the IWS is a micro computer programmed for Internet information server operations. The IWS contains a processor and Internet server software, exemplary forms of which are an Intel 166 Mhz Pentium Processor and Microsoft Internet Information Server software.

The IWS is also loaded with RealAudio Server software from Progressive Network. RealAudio allows a Microsoft Windows .WAV file to be converted into a RealAudio .RA file, a compressed format that allows play back over the Internet in real time, as opposed to first downloading a file and then listening to it. RealAudio accomplishes this by playing an audio file while it is still downloading, using a process called data streaming.

The IWS is also loaded with VDOLive Server software. VDOLive allows a video clip in the Microsoft Windows AVI, Apple Quicktime, or MPEG video file formats to be converted into a VDOLive .VDO format, a compressed format that allows play back over the Internet in real time, as opposed to first downloading a file and then listening to it. VDOLive also utilizes data streaming.

The IVR and the IWS are coupled to a Database Server (DBS) via an Ethernet hub as shown in FIG. 1. The system includes one or more Operator Workstations (OWS) OW1–OWn, through which an operator can interact with and control the DBS, IVR and IWS.

The DBS is a computer programmed for database operations. In the illustrated embodiment, the DBS manages a personal Ad Database which is comprised of multiple tables that manage the creation of advertisement files, audio greeting files, advertisement response files, and photograph and video files. The Ad Database comprises an electronic equivalent of the personal classified advertisements placed via telephone and the Internet, and responses placed to the advertisements.

In addition, the DBS converts audio files received via telephone into the RealAudio .RA format for real time retrieval via the Internet. Conversely, the DBS converts audio files received via the Internet into Dialogic .VOX files for retrieval via telephone. Audio file conversions are done through audio file conversion software, an exemplary form of which is Vox Studio by Xentec.

The DBS contains a processor and a Structured Query Language (SQL) relational database software, exemplary forms of which are the Intel 166 Mhz Pentium Processor and Microsoft SQL Server.

The OWS is a conventional personal computer equipped with a sound card capable of playing the audio data and a video display capable of displaying digitally stored photographs and videos. An exemplary form of the OWS is a microcomputer equipped with an Intel 166 Mhz Pentium Processor and a Creative Labs Sound Blaster sound card. Operators review all incoming advertiser files—text, audio, photograph, and video—to insure that their content is appropriate. Also, operators use advertisers' text messages and audio recordings to create summary text advertisements for publication in a newspaper.

The following sections describe in greater detail the interaction between the IVR, DBS, IWS, and OWS.

Placing an Ad Through a Telephone

An exemplary operation of the system with regard to a specific telephone caller placing a personal advertisement will now be treated to accomplish the process as indicated in FIG. 5. First, suppose a telephone caller at terminal T1 initiates a call to place a personal advertisement in response to an advertisement in XYZ newspaper. The assumed call involves the telephone caller actuating the buttons to input the number, for example, 1-8-0-0-5-5-5-3-3-3-3. As a result, signals are provided to the public telephone network resulting in a connection from the remote terminal T1 to the IVR. Using standard DNIS techniques, the IVR associates the called number, 1-8-0-0-5-5-5-3-3-3-3 with a specific format, for example, a voice personals advertisement taking format.

The caller is first prompted to create a profile of himself by answering a series of questions using the buttons on his touch tone phone. The profile contains data on the advertiser and the type of person the advertiser wishes to meet. Referring initially to FIG. 5, upon receiving a call, the IVR cues the caller to enter his telephone number 801. The IVR stores the telephone number 802 in the field AD_PHONE 203. Next, the IVR cues the caller to enter his gender 803. For example: "If you are a woman, press 1. If you are a man, press 2." The IVR stores the caller's gender 804 in the field AD_GENDER 207. Next, the IVR cues the caller for his marital status 805. For example: "If you are single, press 1. If you are divorced, press 2. If you are widowed, press 3." The caller responds and the IVR stores the caller's marital status 806 in the field AD_MARITAL_STATUS 208. Next, the IVR cues the caller for his age 807. For example: "Please enter your age." The caller's age is then stored 808 in the field AD_AGE 209.

Next, the caller is prompted to indicate the type of person he wishes to meet. The IVR first cues the caller for the martial status of the person he is seeking 825. For example: "If you wish to meet someone who is single, press 1. If you wish to meet someone who is divorced, press 2. If you wish to meet someone who is widowed, press 3." The martial status sought is then stored 826 in the field AD_MARITAL_SOUGHT 212. Next, the IVR cues the caller to enter the lowest age of the person he wishes to meet 827. For example: "Please enter the lowest age of the person you wish to meet." The low age sought is them stored 828 in the field LOW_AGE_SOUGHT 213. Finally, the IVR cues the caller to enter the highest age of the person he wishes to meet 829. For example: "Please enter the highest age of the person you wish to meet." The high age sought is them stored 830 in the field HIGH_AGE_SOUGHT 213. It is to be understood that the actual questions asked about the caller and the person he is seeking are merely illustrative. The actual questions could vary greatly in both number and kind.

Next, the IVR cues the caller to record an audio greeting 812. The advertiser's audio greeting is then stored to a disk file on the IVR 813 and the Ad Database is updated 809. Specifically, the AD_REVIEW_FLAG 210 in the AD_PERSONAL_TABLE (see FIG. 2) is set to FALSE indicating that the ad must be reviewed by an operator. In addition, a new record is created in the AD_GREETINGS_TABLE (see FIG. 3) and the field GR_REVIEW_FLAG 303 is set to FALSE to indicate that the audio greeting has not been reviewed. In the new record, the fields GR_MAILBOX_NUMBER 301, GR_TYPE 302, GR_FILENAME 304, GR_DATE_TIME 305 in the AD_GREETINGS_TABLE (see FIG. 3) are also populated to indicate the advertiser's mailbox number, the format of the audio file, the location of the audio file on the IVR, and the date and time the greeting was recorded. The field GR_TYPE is set to VOX to indicate that the audio recording is in the Dialogic .VOX file format. Finally, the field GR_CONVERSION_FLAG is set to FALSE to indicate that the audio file must be converted from the Dialogic .VOX format to create a new audio file in the RealAudio .RA format for playback on the Internet.

The IVR then cues the caller to indicate if he wishes to record an e-mail address 816. For example: "Press 1 to input an e-mail address. Press 2 to decline." If the caller elects to leave an e-mail address, the IVR cues the caller to record his e-mail address 817. The audio recording is stored to a disk file on the IVR 818 and the field AD_EMAIL_FILENAME 205 in AD_PERSONAL_TABLE (see FIG. 2) is set, indicating that an e-mail audio file exists and listing its location on the IVR.

Next, the IVR assigns the advertiser a five digit mailbox number 819. For example: "Your 5-digit mailbox number is 12345." The mailbox number is then stored 820 in the field AD_MAILBOX_NUMBER 201. The IVR then cues the caller to enter a five digit password 821. The password is stored 822 in the field AD_PASSWORD 202. This allows only the caller to recall messages stored in the mailbox which the caller created.

In addition, the IVR stores the date the advertisement is taken in the field AD_DATE_TIME 206, and updates the field AD_ORIGIN 211 to indicate that the personal advertisement originated on the telephone 823. Finally, the IVR creates an electronic mailbox for the advertiser on the IWS 824, using the mailbox number stored in the field AD_MAILBOX_NUMBER 201 as the electronic mailbox address. This allows respondents to submit audio, video and photographic files in response to the advertiser's advertisement.

Finally, the IVR queries the Ad Database to determine if there are other existing advertiser's whose profile matches that of the new advertiser 831. More specifically, there is a match if the values in the field AD_MARITAL_STATUS 208 and the values in the field AD_MARITAL_SOUGHT 212 match for each advertiser, and if the value in the field AD_AGE 209 for each advertiser is within the range of values in the fields AD_LOW_AGE_SOUGHT 213 and AD_HIGH_AGE_SOUGHT 214 for the other advertiser. If the query finds one or more ads that match, the IVR speaks the number of matching ads to the caller 832. For example: "The number of ads that match your preferences is 5." The caller is then given both a 900 number 833 and an Internet address 834 that can be used to retrieve the matches, and the call is terminated 835. If no matches are found, the IVR tells the caller that no matches were found, and the call is terminated 835.

In addition, the mailbox numbers of matching advertisements are placed in a notification queue 835, together with delivery information corresponding to the matching advertisement so that the existing advertisers can be notified that a new personal advertisement has come onto the system that matches the existing advertisers' profile. The delivery information includes the telephone number and e-mail address, if available, of the existing advertiser which is to be notified, together with the mailbox number of the new advertisement coming onto the system.

Placing an Ad Through the Internet

Figure 6:
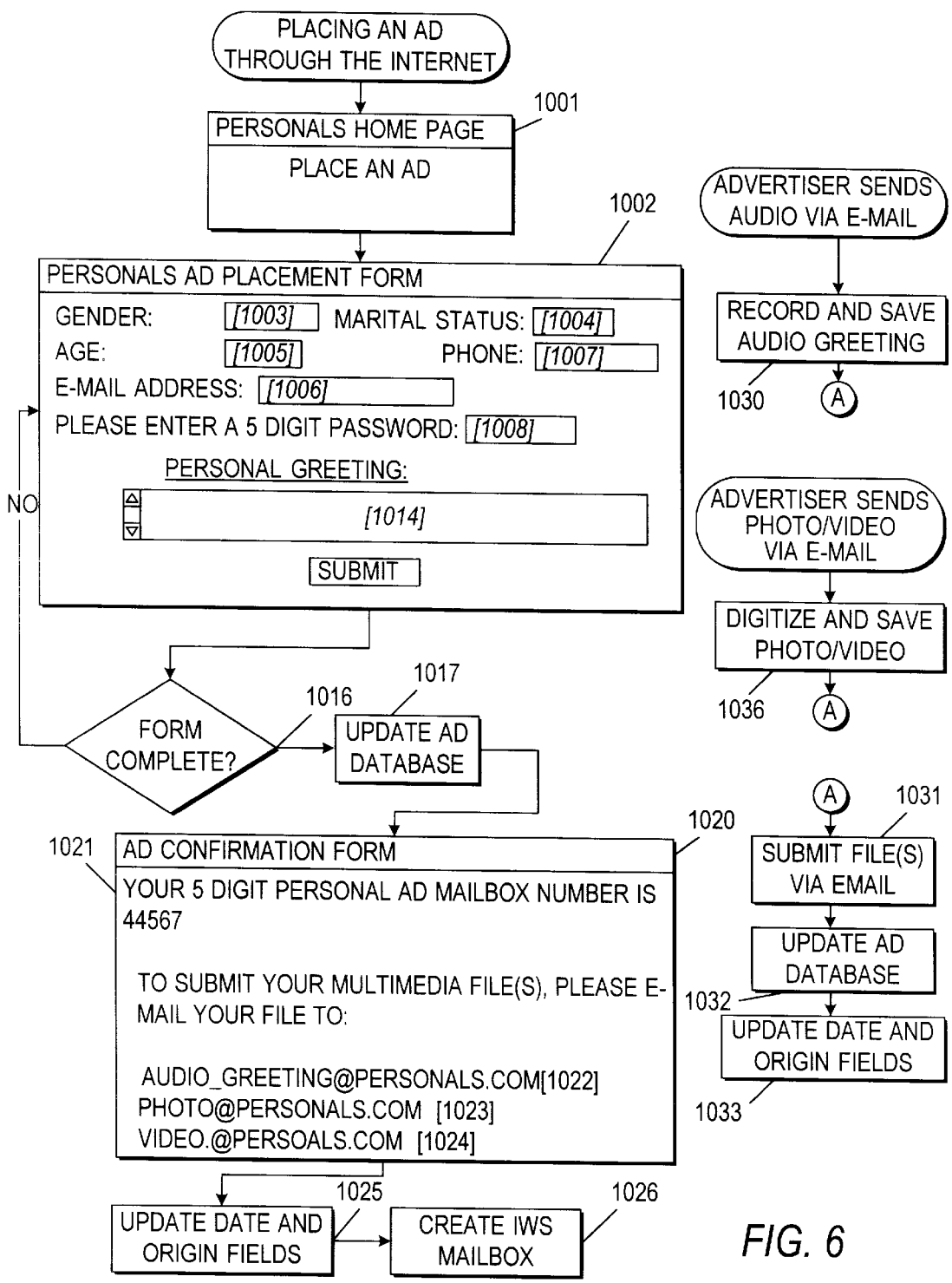
FIG. 6 shows a flow diagram of an exemplary operation of the present invention, more specifically placing an advertisement through the Internet.
Figure 7:
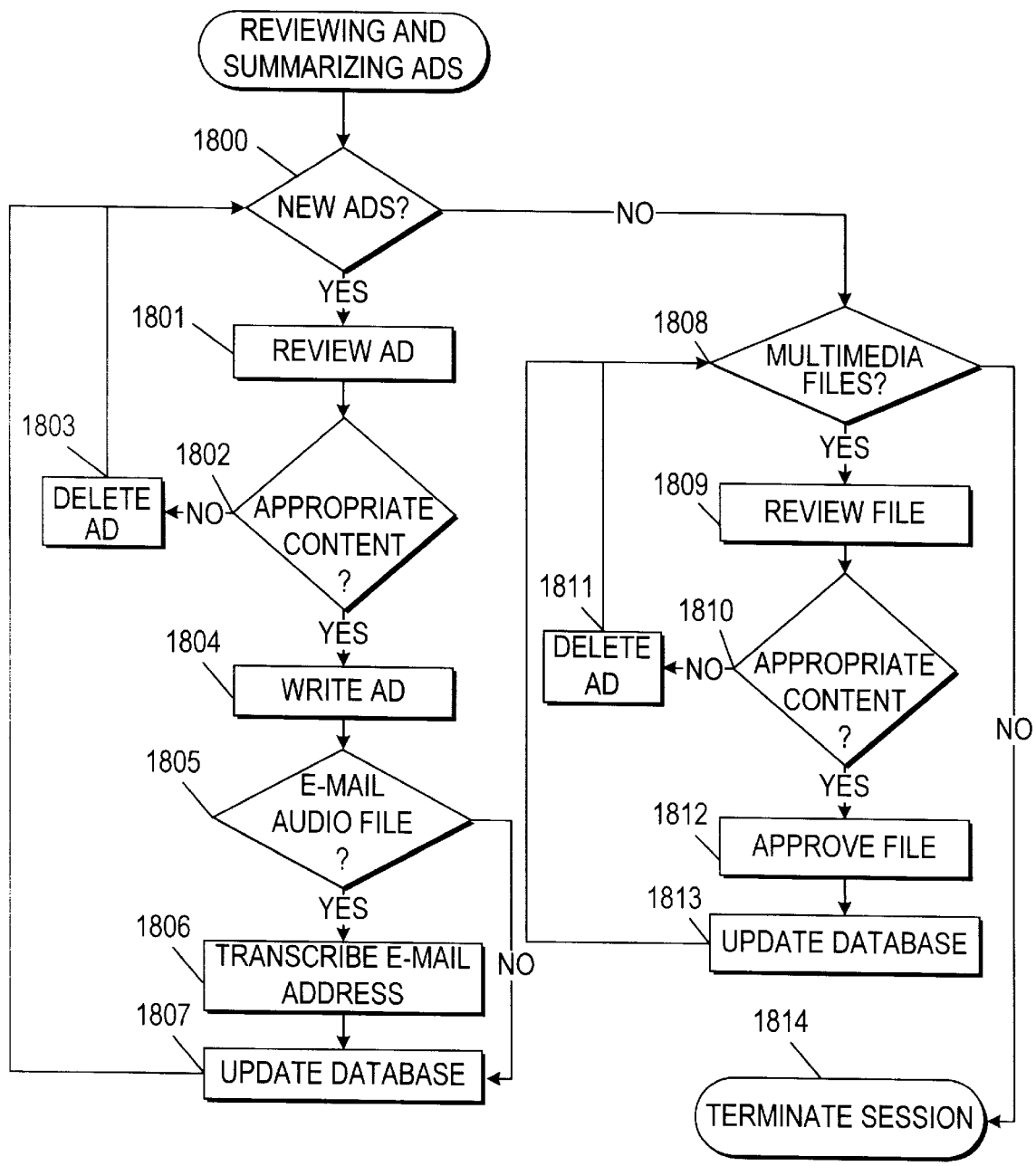
FIG. 7 shows a flow diagram of an exemplary operation of the process of reviewing and summarizing advertisements as accomplished by the present invention.

An exemplary operation of the system with regard to a specific Internet user placing a personal advertisement will now be treated to accomplish the process as indicated in FIG. 6. First, suppose a Internet user at terminal CT1 connects to the Internet to place a personal advertisement in response to an advertisement in XYZ newspaper. The assumed Internet user connects to the Internet and inputs a Uniform Reference Locator (URL), for example: http://www.personal_ads.com, resulting in a connection from the remote terminal CT1 to a Home Page 1001 on the IWS.

Referring to FIG. 6, from the Home Page 1001 on the IWS, the Internet user selects an Ad Placement Form 1002. The Ad Placement Form 1002 contains the following input fields corresponding to fields in the Ad Database as indicated:

| | |
|---|---|
| Gender 1003 | AD_GENDER 207 |
| Marital Status 1004 | AD_MARITAL_STATUS 208 |
| Age 1005 | AD_AGE 209 |
| Martial Sought 1034 | AD_MARTIAL_SOUGHT 212 |
| Low Age Sought 1035 | AD_LOW_AGE_SOUGHT 213 |
| High Age Sought 1036 | AD_HIGH_AGE_SOUGHT 214 |
| E-mail address 1006 | AD_EMAIL_ADDRESS 204 |
| Phone Number 1007 | AD_PHONE 203 |
| Password 1008 | AD_PASSWORD 202 |
| Greeting Text 1014 | GR_FILENAME 304. |

This process largely parallels the process of placing a personal advertisement via a telephone. The password 1008 is used by the advertiser to retrieve messages and the e-mail address 1006 and telephone number 1007 are used to contact the advertiser. The gender 1003, age 1005, and marital status 1004 fields create a demographic profile of the advertiser. The marital sought 1034, low age sought 1035 and high age sought 1036 fields complete the advertiser's demographic profile by indicating the type of person the advertiser wishes to meet. Finally, the field Greeting Text 1014 comprises the advertiser's text personal advertisement.

The Internet user completes the Ad Placement Form 1002 and presses the "Submit" button to submit her ad. The form is checked by the IWS for completeness 1016. If the form is incomplete, the user is returned to the Ad Placement Form 1002. If the form is complete, the IWS updates the Ad Database 1017. This includes assigning the user a five digit mailbox number and storing it in the field AD_MAILBOX_NUMBER 201. In addition, the advertiser's profile, contact information, password and greeting are added to the Ad Database. Also, the advertiser's text greeting is stored to a disk file on the IWS. Next, the AD_REVIEW_FLAG 210 in the AD_PERSONAL_TABLE (see FIG. 2) is set to FALSE indicating that the advertisement must be reviewed by an operator 10, a new record is created in the AD_GREETINGS_TABLE (see FIG. 3), and the field GR_REVIEW_FLAG 303 is set to FALSE to indicate that the text greeting has not been reviewed. In the new record, the fields GR_MAILBOX_NUMBER 301, GR_TYPE 302, GR_FILENAME 304, GR_DATE_TIME 305 in the AD_GREETINGS_TABLE (see FIG. 3) are also populated to indicate the advertiser's mailbox number, the file format, the location of the text file on the IWS, and the date and time the greeting was placed. Specifically, the field GR_TYPE is set to TEXT. Finally, the field GR_CONVERSION_FLAG is set to TRUE to indicate that the text does not need to be converted to a different format.

Next, the IWS queries the Ad Database to determine if there are other existing advertiser's whose profile matches that of the new advertiser 1018. The IWS then creates an Ad Confirmation Page 1020. If the query finds one or more advertisements that match, the Ad Confirmation Page displays a text message of the number of matching advertisements 1027. The text message is displayed as a hyper-link which can be followed by a browser to the actual matching ads. In addition, the Ad Confirmation Page 1020 confirms the advertiser's mailbox number 1021, and gives the advertiser instructions on how to include an audio greeting 1022, photograph 1023, or video clip 1024 with her personal advertisement. Also, the IWS stores the date and time when the advertisement is taken in the field AD_DATE_TIME 206, and updates the field AD_ORIGIN 211 to indicate that the personal advertisement originated on the Internet 1025. Finally, the IWS creates an electronic mailbox for the advertiser 1026, using the mailbox number stored in the field AD_MAILBOX_NUMBER as the electronic mail address. This allows respondents to submit audio, video and photographic files in response to the advertiser's advertisement.

In addition, the mailbox numbers of matching ads are placed in a notification queue 1038, together with delivery information corresponding to the matching advertisement so that the existing advertisers can be notified that a new personal advertisement has come onto the system that matches the existing advertisers' demographic profile. The delivery information includes the telephone number and e-mail address, if available, of the existing advertiser to be notified, together with mailbox number of the new advertisement coming onto the system.

Enhancing an Internet Ad with Audio, Photograph and Video

A more detailed explanation of how an advertiser submits an audio greeting, photograph, or video clip via CT1 will now be given. To submit an audio greeting, the advertiser first makes an audio recording using a WAV file editor and then saves the file using her five digit mailbox number as the file name 1030 (see FIG. 6), for example: 44567.wav. The advertiser then submits the audio file using e-mail to an audio greeting electronic mailbox 1031, for example: audio_greeting@personals.com. The advertiser's audio recording is then stored to a disk file on the IWS.

In addition, a new record is created in the AD_GREETINGS_TABLE (see FIG. 3) and the Ad Database is updated 1032. Specifically, the field GR_REVIEW_FLAG 303 is set to FALSE to indicate that the audio greeting has not been reviewed. Also, the fields GR_MAILBOX_NUMBER 301, GR_TYPE 302, GR_FILENAME 304, GR_DATE_TIME 305 in the AD_GREETINGS_TABLE (see FIG. 3) are populated to indicate the advertiser's mailbox number, the format of the audio file, the location of the audio file on the IWS, and the date and time the greeting was placed. The field GR_TYPE is set to WAV to indicate that the audio recording is in the Microsoft .WAV file format. Finally, the field GR_CONVERSION_FLAG is set to FALSE to indicate that the audio file must be converted from the Microsoft .WAV format to create two new audio files: one in the RealAudio .RA format for playback on the Internet, and another in the Dialogic .VOX format for playback via the telephone.

To enhance a personal advertisement with a photograph, the advertiser first digitizes a photograph using a scanner or takes a photograph with a digital camera and then saves the image to a .GIF file using her five digit mailbox number as the file name 1037, for example: 44567.gif. The advertiser then submits the graphic file using e-mail to an photograph electronic mailbox, for example: photo@personals.com 1031.

The advertiser's photo is stored to a disk file on the IWS and the Ad Database is updated 1032. Specifically, a new record is created in the AD_GREETINGS_TABLE (see FIG. 3) and the field GR_REVIEW_FLAG 303 is set to FALSE to indicate that the graphic file has not been reviewed. In each new record, the fields GR_MAILBOX_NUMBER 301, GR_TYPE 302, GR_FILENAME 304, GR_DATE_TIME 305 in the AD_GREETINGS_TABLE (see FIG. 3) are also populated to indicate the advertiser's mailbox number, the format of the graphic file, the location of the graphic file on the IWS, and the date and time when the photograph was received. The field GR_TYPE 302 is set to GIF to indicate that the graphic file is in the .GIF file format. Finally, the field GR_CONVERSION_FLAG 306 is set to TRUE to indicate that no file conversion is necessary as .GIF is the graphic file format used by the IWS. If other graphic formats were accepted, they might have to be converted to a .GIF format, depending on the file formats supported by the IWS. If file conversion is necessary, the field GR_CONVERSION_FLAG 306 would be set to FALSE.

To enhance a personal advertisement with video clip, the advertiser first digitizes the video clip and then saves the image to a Microsoft .AVI file using her five digit mailbox number as the file name 1036, for example: 44567.avi. Other video formats such as Apple Quicktime, or MPEG video could also be used. The advertiser then submits the graphic file using e-mail to an electronic mailbox, for example: video@personals.com 1031.

The advertiser's video clip is stored to a disk file on the IWS and the Ad Database is updated 1032. Specifically, a new record is created in the AD_GREETINGS_TABLE (see FIG. 3) and the field GR_REVIEW_FLAG 303 is set to FALSE to indicate that the video file has not been reviewed. In each new record, the fields GR_MAILBOX_NUMBER 301, GR_TYPE 302, GR_FILENAME 304, GR_DATE_TIME 305 in the AD_GREETINGS_TABLE (see FIG. 3) are populated to indicate the advertiser's mailbox number, the format of the video file, the location of the video file on the IWS, and the date and time when the video was received. Specifically, the field GR_TYPE 302 is set to AVI to indicate that the video clip is in the Microsoft .AVI file format. Finally, the field GR_CONVERSION_FLAG 306 is set to FALSE to indicate that the video file must be converted to the VDOLive format for real time playback on the Internet.

Reviewing and Summarizing Ads

All new personal advertisements are reviewed by an operator at OWS OW1 to insure that their content is appropriate. Also, each greeting submitted by an advertiser, whether it be an audio greeting recorded by an advertiser via a telephone or a text greeting placed by an advertiser via the Internet, is summarized by an operator to create a short, approximately twenty word, classified text advertisement for publication in a newspaper. The twenty word limit is a function of newspaper imposed space limitations. It should be noted that space limitations, if they exist at all, may vary widely from newspaper to newspaper. In another format, text advertisements that are published in the newspaper are first placed with a live operator via a telephone, precluding the need to summarize an audio recording.

Figure 10:
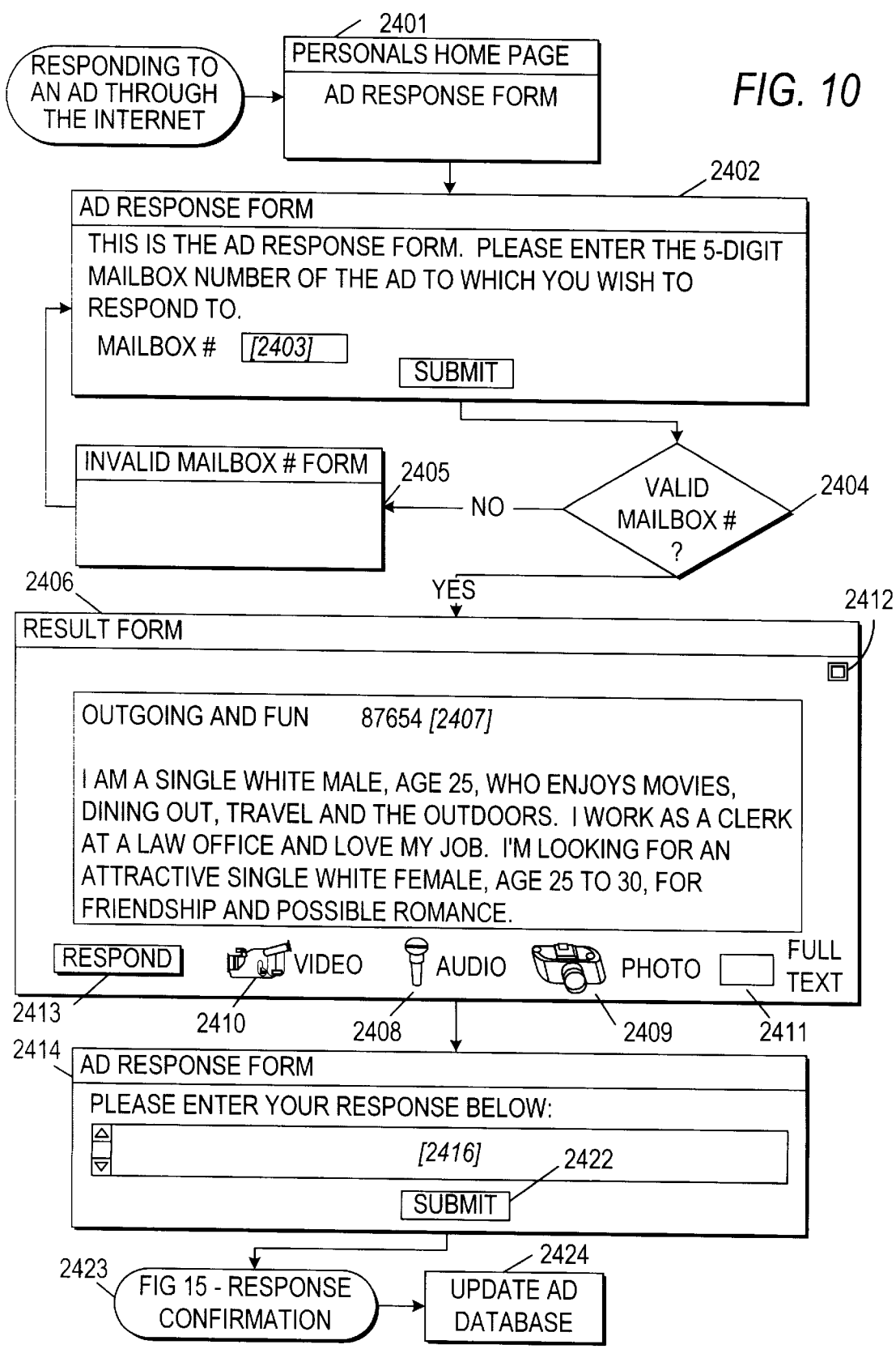
FIG. 10 shows a flow diagram of an exemplary operation of the process of responding to an advertisement through the Internet as accomplished by the present invention.

An exemplary operation of the process of reviewing and summarizing advertisements with regard to a specific operator at OP1 will now be treated to accomplish the process as indicated in FIG. 10. The operator first queries the Ad Database to determine if there are new advertisements to review 1800. Specifically, the query looks for all ads in the AD_PERSONAL_TABLE(see FIG. 2) where the field AD_REVIEW_FLAG 210 is set to FALSE. If the query finds a new advertisement, the operator first reviews the advertiser's greeting 1801 as found in the AD_GREETINGS_TABLE (see FIG. 3). If the advertisement was placed via telephone, this consists of listening to the advertiser's audio greeting. If the advertisement was placed via the Internet, this consists of reading the text greeting. The operator then determines if the greeting's content is appropriate 1802. If the greeting's content is inappropriate, the advertisement is deleted, the record is purged from the database 1803 and the operator is returned to block 1800 to select another new advertisement to review. If the greeting's content is appropriate, the operator writes a twenty word summary of the greeting 1804. The operator then queries the database to determine if the advertiser recorded an e-mail address 1805. If an e-mail address audio recording is found, the operator transcribes the e-mail address 1806. The operator then updates the Ad Database 1807.

Specifically, the advertiser's twenty word text summary is stored to a disk file on the IWS. The AD_REVIEW_FLAG 210 in the AD_PERSONAL_TABLE (see FIG. 2) is set to TRUE indicating that the ad has been reviewed. In addition, a new record for the text summary is created in the AD_GREETINGS_TABLE (see FIG. 3) and the field GR_REVIEW_FLAG 303 is set to TRUE indicating that the record has been reviewed. In the new record, the fields GR_MAILBOX_NUMBER 301, GR_TYPE 302, GR_FILENAME 304, GR_DATE_TIME 305 in the AD_GREETINGS_TABLE (see FIG. 3) are also populated to indicate the advertiser's mailbox number, the file format, the location of the text file on the IWS, and the date and time. The field GR_TYPE is set to TEXT. Finally, the field GR_CONVERSION_FLAG 306 is set to TRUE to indicate that the text does not need to be converted to a different format.

The operator then returns to block 1800 to select another advertisement to review in order to continue processing advertisements. If no new advertisements are found, the operator queries the Ad Database to determine if any multimedia files (audio, video, or photo) have been submitted via the Internet to enhance a personal advertisement 1808. Specifically, the query looks for all advertisements in the AD_PERSONAL_TABLE (see FIG. 2) where the field AD_REVIEW_FLAG 210 is set to TRUE that has files in the AD_GREETING_TABLE (see FIG. 3) where the GR_REVIEW_FLAG 303 is set to FALSE. If the query finds a multimedia file, the operator first reviews the file 1809. If it is an audio file, this consists of listening to the advertiser's audio greeting. If it is a video or graphic file, this consists of viewing the file. The operator then determines if the greeting's content is appropriate 1810. If the greeting's content is inappropriate, the filed is deleted and the record purged from the database 1811. The operator is then returned to block 1808 to continue processing multimedia files. If the file's content is appropriate, the operator approves the file 1812 and updates the database 1813. Specifically, this consists in setting the field GR_REVIEW_FLAG 303 to TRUE to indicate that the file has been reviewed.

If the file is an audio file, the OWS converts the file to create a new RealAudio RA file and stores the file on the IWS. The OWS also converts the file to create a Dialogic VOX file and stores the file on the IVR. For each new audio file, a new record is created in the AD_GREETINGS_TABLE (see FIG. 2) and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the audio file on the IVR. Also, the field GR_REVIEW_FLAG 303 is set to TRUE to indicate that the file has been reviewed. Finally, the field GR_CONVERSION_FLAG is set to TRUE to indicate that the audio file does not need to be converted.

If the file is a video file, the OWS converts the Microsoft AVI file to create a new VDOLive file and stores the file on the IWS. Also, a new record is created in the AD_GREETINGS_TABLE (see FIG. 2) and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the video file on the IVR. Also, the field GR_REVIEW_FLAG 303 is set to TRUE to indicate that the file has been reviewed. Finally, the field GR_CONVERSION_FLAG 306 is set to TRUE to indicate that the video file does not need to be converted.

The operator then returns to block 1808 to continue processing multimedia files. If no new multimedia files are found, the session is terminated 1814.

Publishing Ads in the Newspaper

Each week, all the twenty-word summary text advertisements from personal advertisements submitted via telephone and via the Internet are published in a newspaper along with their five digit mailbox numbers. FIG. 8 depicts personal advertisements as they would appear in the local newspaper.

Icons are included in each advertisement that represent the origin of an advertisement (via telephone or via the Internet) and what additional information or multimedia, if any, is available on the Internet. For example, an advertisement placed via the telephone contains a telephone icon 2001; an advertisement placed via the Internet contains a computer icon 2002. If there is additional text on the Internet, an advertisement contains an icon denoting additional text 2004. The presence of a photo or video clip is indicated respectively by a still camera 2004 and video camera 2005 icons.

Responding to an Ad Through a Telephone

Figure 9:
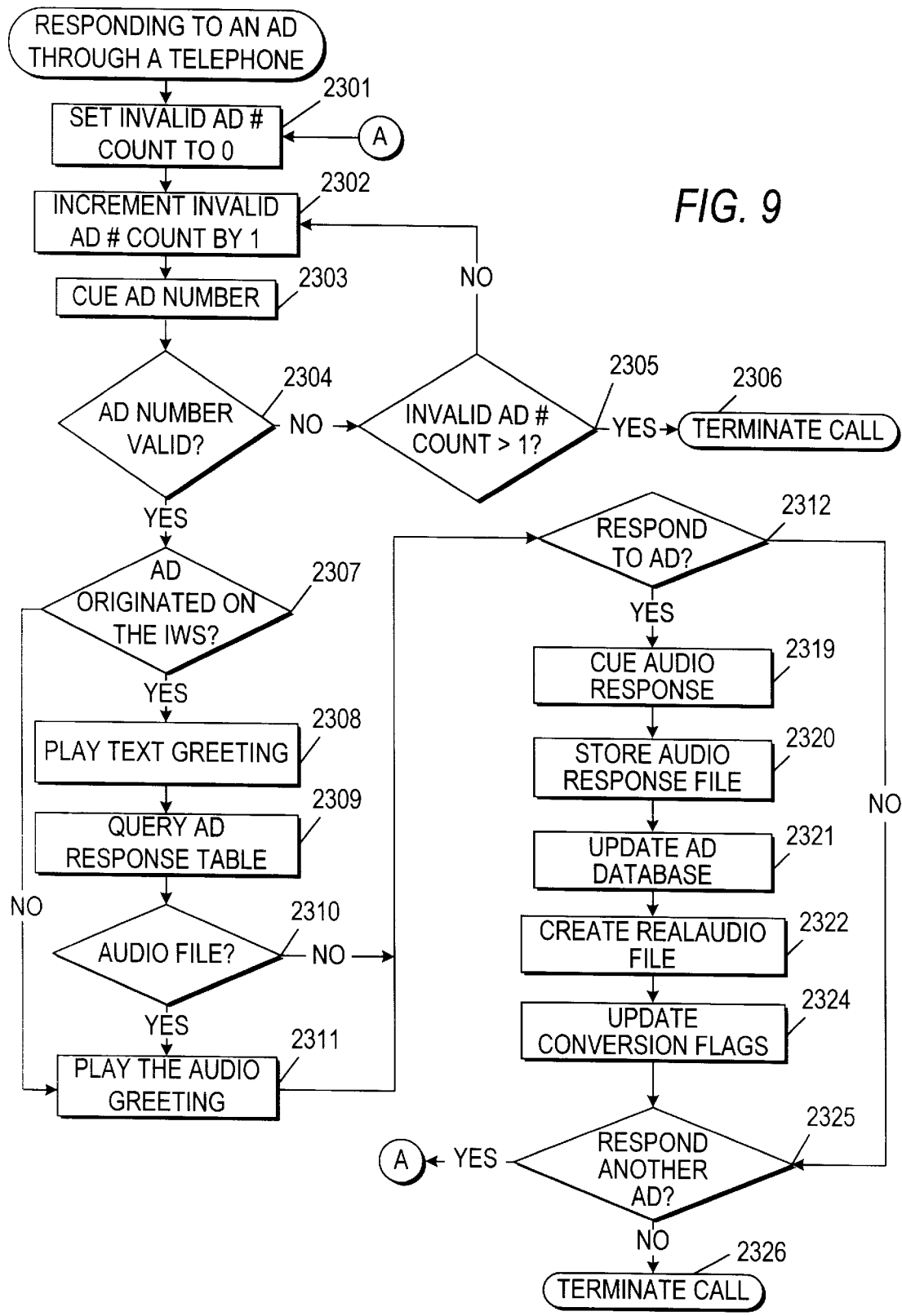
FIG. 9 shows a flow diagram of an exemplary operation of the process of responding to an advertisement through a telephone as accomplished by the present invention.

An exemplary operation of the system with regard to a telephone caller responding to a personal advertisement will now be treated to accomplish the process as indicated in FIG. 9. First, suppose a telephone caller at terminal T1 places a call to respond to a personal advertisement advertised in XYZ newspaper. The assumed call involves the telephone caller actuating the buttons to input the number 1-9-0-0-7-7-7-3-3-3-3, for example. As a result, signals are provided to the PTN resulting in a connection from the remote terminal T1 to the IVR. Using standard DNIS techniques, the IVR associates the called number 1-9-0-0-7-7-7-3-3-3-3 with a specific format, for example, a voice personals response format.

Referring to FIG. 9, upon receiving a call, the IVR sets the "invalid mailbox number count" equal to zero 2301. The IVR then increments the "invalid mailbox number count" by one 2302 and cues the caller for a mailbox number 2303. Upon the caller entering a mailbox number, the IVR queries the field AD_MAILBOX_NUMBER 201 to determine if the mailbox number is valid 2304. If the mailbox number is invalid, the IVR determines if the caller has exceeded the maximum number of attempts allowed 2305. If the caller has exceeded the maximum number of attempts allowed, the call is terminated 2306. If the maximum number of attempts allowed has not been exceeded, the IVR increments the "invalid mailbox number count" by one 2302 and again cues the caller for a mailbox number 2303.

If the mailbox number is valid, the IVR queries the field AD_ORIGIN 211 to determine whether the advertisement originated on the Internet or on the telephone 2307. If the advertisement originated on the telephone, the IVR plays the advertiser's audio greeting 2311. If the advertisement originated on the Internet, the IVR uses text to speech to play the advertiser's text greeting as placed on the Internet 2308. The IVR then queries the AD_GREETINGS_TABLE (see FIG. 2) to determine if the Internet advertiser also submitted an audio greeting 2309. If the query does not find an audio greeting 2310, the IVR prompts the caller to indicate if he wishes to respond to the advertisement 2312. If the query finds an audio greeting 2310, the IVR plays the audio greeting 2311. The IVR then prompts the caller to indicate if he wishes to respond to the advertisement 2312.

If the caller elects not to respond to the advertisement, he is given the option of having the IVR find other advertisements that are similar to the one he just listened to 2325. If the caller elects to respond to the advertisement, the IVR first cues him to record his response 2319. The IVR then stores the response to a disk file and updates the Ad Database 2321. Specifically, the IVR creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the advertisement responded to, the date and time of the response, the format of the response, and the location of the response file on the IVR.

The field RSP_TYPE 504 is set to VOX to indicate that the audio recording is in the Dialogic. VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR also creates a new RealAudio .RA file from Dialogic .VOX file and stores the RealAudio file to a disk file on the IWS. Specifically, the IVR creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the advertisement responded to, the date and time of the response, the format of the response, and the location of the response file on the IVR. The field RSP_TYPE 504 is set to RA to indicate that the audio recording is in the RealAudio .RA file format.

Finally, the field RSP_CONVERSION_FLAG 506 is set to TRUE for both the audiotext .VOX file and the RealAudio .RA file to indicate that the audio files do not need to be converted.

In addition, the mailbox number of the personal advertisement responded to is placed in a notification queue 2322, together with delivery information corresponding to the advertisement, so that the advertiser can be notified that a response has been left for her advertisement. The delivery information includes the telephone number and e-mail address, if available, of the advertiser who is to be notified.

The caller is then asked if he wants the IVR to automatically find other ads that are similar to the one he just responded to 2325. If the caller declines this option, the call is terminated 2326.

Responding to an Ad through the Internet

An exemplary operation of the system with regard to a specific Internet user responding to a personal advertisement via the Internet will now be treated to accomplish the process as indicated in FIG. 10. First, suppose an advertiser at terminal CT1 connects to the Internet to respond to a personal advertisement advertised in XYZ newspaper. The assumed Internet user connects to the Internet and inputs a URL, for example: http://www.personal_ads.com, resulting in a connection from the remote terminal CT1 to a Home Page on the IWS.

Referring to FIG. 10, from the Home Page 2401 on the IWS, the Internet user selects an Ad Response Form 2402. The Ad Response Form instructs the Internet user to enter the five digit mailbox number of the advertisement she wishes to respond to 2403. Upon the Internet user entering her mailbox number, the IWS queries the field AD_MAILBOX_NUMBER in the Ad Database to determine if the mailbox number is valid 2404. If the mailbox number is invalid, the Internet user is presented with an Invalid Mailbox Number Form 2405.

Figure 11:
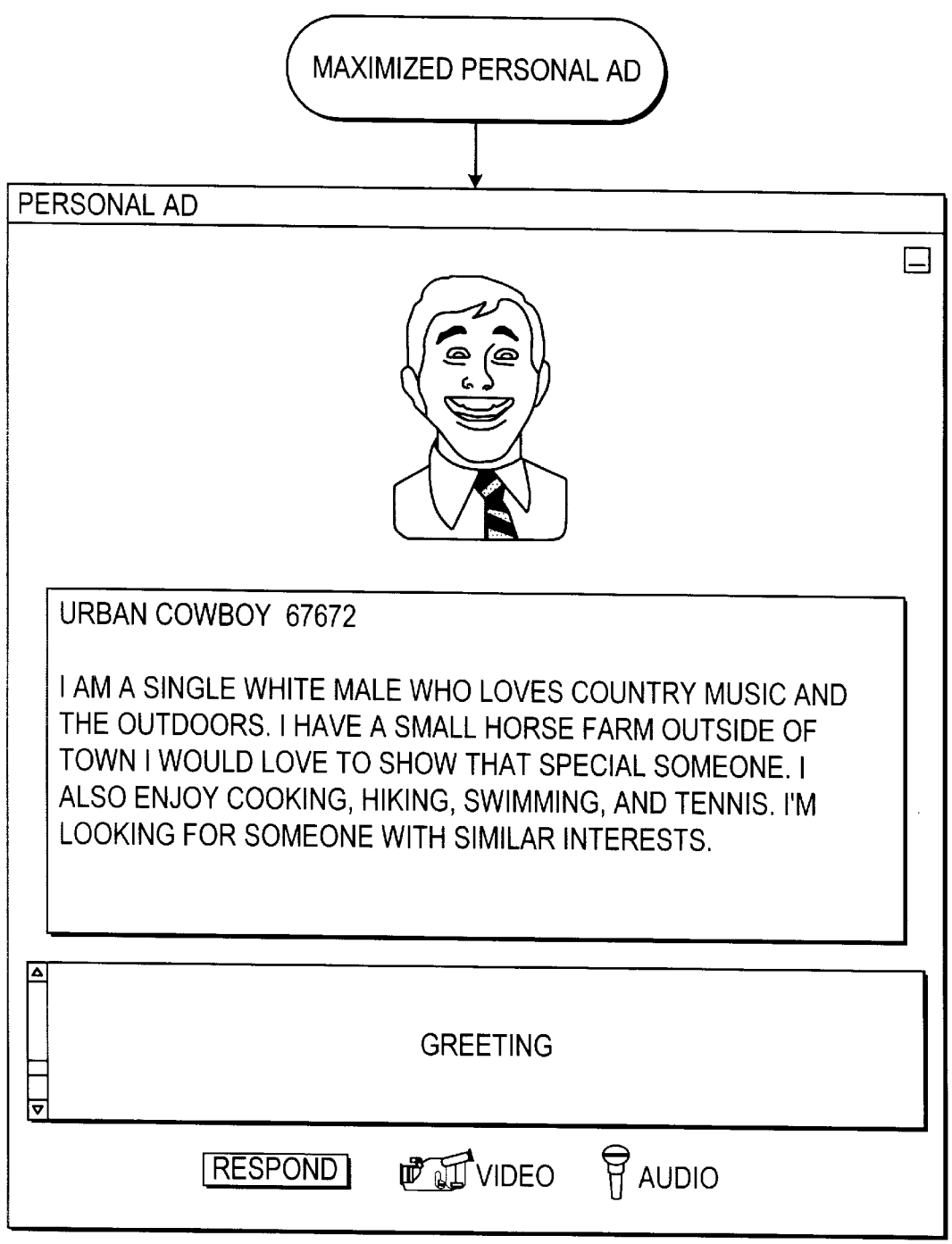
FIG. 11 shows a maximized personal advertisement as seen by the Internet user who chooses to expand the advertisement to full-page size.

If the mailbox number is valid, the IWS presents the Internet user with a Results Form 2406. The Results Form 2406 shows the advertisement the Internet user selected. Specifically, the Results Form shows the twenty word text advertisement that appears in the newspaper 2407. In addition, the advertisement contains one or more icons that represent additional text or multimedia files (audio, video, photograph) related to the advertisement that are available on the IWS, and indicates a path to other advertisements which match the advertisement to which the Internet user is responding. These icons include an audio icon 2408 to denote the advertiser's audio greeting, a still camera icon 2409 to denote a photograph of the advertiser, a video camera icon 2410 to denote a video clip of the advertiser, a paper icon 2411 to denote the advertiser's full text greeting, if the advertisement was placed on the Internet and a "matching" icon to denote that the IWS has identified other advertisements that are similar to the one being responded to 2415. It is to be understood that these icons are merely representative and that many other possibilities exist to denote the existence of text and multimedia files. By clicking on an icon, the Internet user can view or listen to the associated file. In addition, by selecting a maximize bar 2412, the Internet user can expand an advertisement to full page size (see FIG. 11). The Internet user responds to an advertisement by selecting the "Respond" button 2413.

When the Internet user selects the respond button, she is presented with an Ad Response Form 2414. The Internet user creates a response by completing a response text field 2416. After completing the Ad Response Form, the Internet user submits the form by pressing the "Submit" button 2422. The advertiser is then presented with a Response Confirmation Form 2423. The Response Confirmation Form gives the advertiser information on enhancing her response with an audio message, photograph, or video clip.

The IWS then stores the response to a disk file and updates the Ad Database 2424. Specifically, the IWS creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the advertisement responded to, the date and time of the response, the format of the response, and the location of the response file on the IWS. The field RSP_TYPE 504 is set to TEXT. Finally, the field RSP_CONVERSION_FLAG 506 is set to TRUE to indicate that the text does not need to be converted to a different format.

Enhancing a Response with Audio, Photograph and Video

Figure 12:
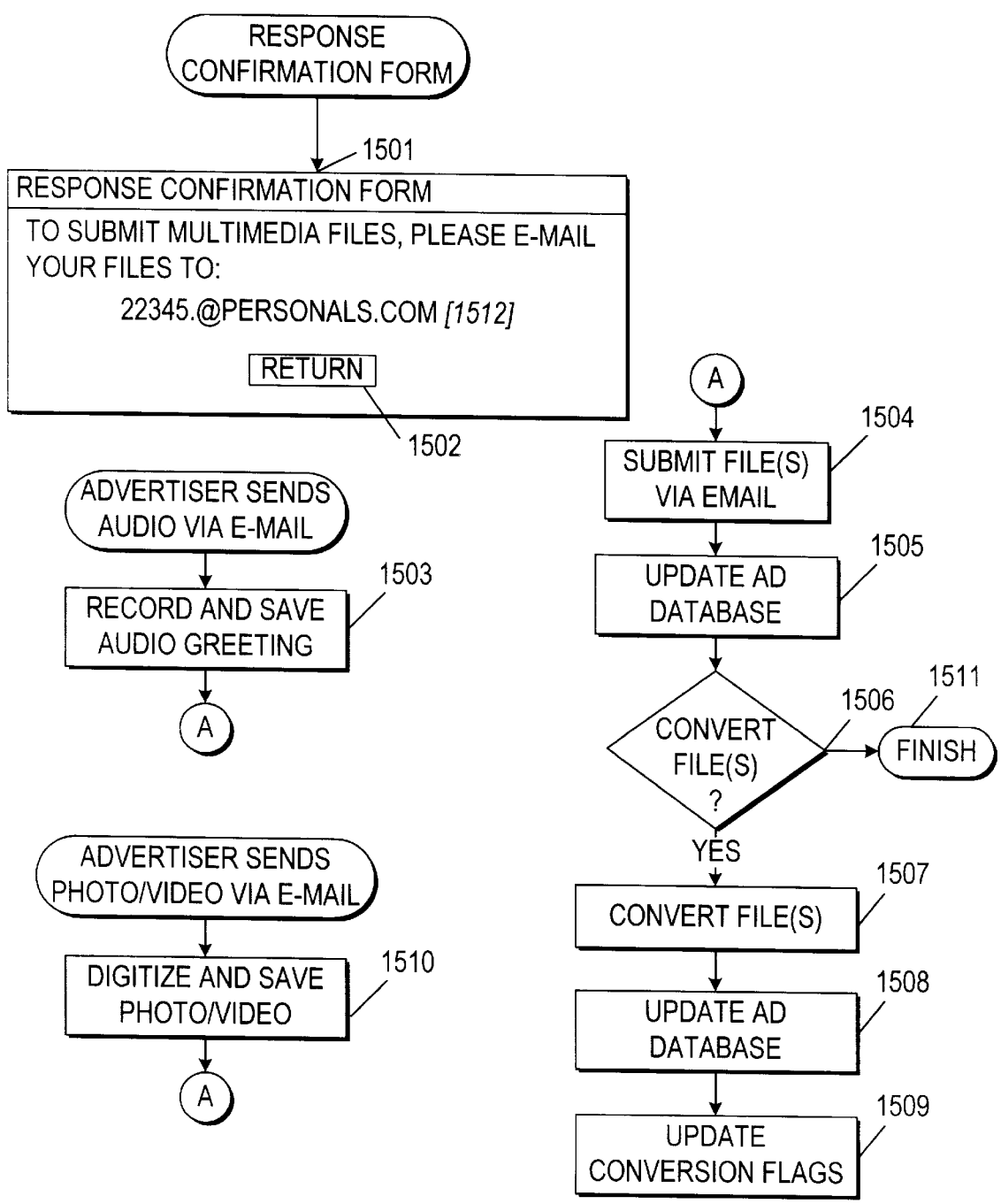
FIG. 12 shows a flow diagram of the response confirmation process, including the Response Confirmation Form which gives the Internet user instructions on how to enhance a response to an advertisement with, audio, video or a photograph.

As already indicated, after a text response has been submitted via the Internet, the Internet user is shown a Response Confirmation Form 1501 (see FIG. 12). The response confirmation form gives the Internet user instructions on how to enhance a response to an advertisement with audio, video, or a photograph.

A more detailed explanation of how a respondent submits an audio response, photograph, or video clip via CT1 will now be given. To submit an audio response, the Internet user first makes an audio recording using a WAV file editor and then saves the file using her five digit mailbox number as the file name 1503, for example: 44567.wav. The Internet user then submits the audio file using e-mail to the recipient's electronic mailbox on the IWS 1504, for example: 22345@personals.com 1512. The Internet user's audio response is stored to a disk file on the IWS and the Ad Database is updated 1505.

Specifically, the IVR creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 506 to indicate the mailbox number of the advertisement responded to, the date of the response, the format of the audio file, and the location of the audio file on the IVR. The field RSP_TYPE 504 is set to WAV to indicate that the audio recording is in the Microsoft .WAV file format. Also, the field RSP_CONVERSION_FLAG 506 is set to FALSE to indicate that the audio file must be converted from the Microsoft .WAV format to create two new audio response files: one in the RealAudio .RA format for playback on the Internet, and another in the Dialogic .VOX format for playback via the telephone.

The IWS determines if conversion of audio files is needed 1506, and then creates a new RealAudio .RA file and Dialogic .VOX file from the Microsoft .WAV file 1507. The RealAudio file is stored on the IWS and the Dialogic file is stored on the IVR. The IWS also updates the Ad Database 1508. Specifically, for each new audio file, the IWS creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the ad responded to, the date of the response, the format of the response, and the location of the response file on the IWS. Finally, the field RSP_CONVERSION_FLAG 506 is set to TRUE for both the source audio file (.WAV) and the target audio files (.VOX and .RA) to indicate that the audio files do not need to be converted 1509.

To send a photograph in response to an ad, the Internet user first digitizes a photograph using a scanner or takes a photograph with a digital camera and then saves the image to a .GIF file using her five digit mailbox number as the file name 1510, for example: 44567.gif. The respondent then submits the graphic file using e-mail to the recipient's electronic mailbox, for example: 22345@personals.com 1504. The respondent's photo is stored to a disk file on the IWS and the Ad Database is updated 1505.

Specifically, the IWS creates a new record in the AD_RESPONSE_TABLE (see FIG. 4) and populates the RSP_MAILBOX_NUMBER 501, RSP_DATE_TIME 503, RSP_TYPE 504, and RSP_FILENAME 505 to indicate the mailbox number of the advertisement responded to, the date of the response, the file format of the photograph, and the location of the file on the IWS. The field RSP_TYPE 504 is set to GIF to indicate that the graphic file is in the .GIF file format. Finally, the field RSP_CONVERSION_FLAG 506 is set to TRUE to indicate that no file conversion is necessary as .GIF is the graphic file format used by the IWS 1506. It should be noted that file conversion may or may not be necessary depending on what file formats are supported by the IWS and IVR and in what formats the system allows users to submit files.

To send an advertiser a video clip, the Internet user first digitizes a video clip and then saves the image to a Microsoft .AVI file using her five digit mailbox number as the file name 1510, for example: 44567.avi. Other video formats such as Apple Quicktime, or MPEG video could also be used. The respondent then submits the graphic file using e-mail to the recipient's electronic mailbox, for example: 22345@personals.com 1504. The respondent's video is stored to a disk file on the IWS and the Ad Database is updated 1505.

Specifically, the IVR creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the advertisement responded to, the date of the response, the file format of the video clip, and the location of the video file on the IWS. Specifically, the field RSP_TYPE 504 is set to AVI to indicate that the audio recording is in the Microsoft .AVI file format. Finally, the field RSP_CONVERSION_FLAG 506 is set to FALSE to indicate that the VDOLive file must be converted to the VDOLive format for real time playback on the Internet.

The IWS determines that the video file must be converted to VDOLive format 1506. The IWS creates a new VDOLive file from the Microsoft .AVI file and stores the new file to a disk file 1507 on the IWS and updates the Ad Database 1508. A new record in the AD_RESPONSE_TABLE (see FIG. 4) is created and the IWS populates the RSP_MAILBOX_

NUMBER 501, RSP_DATE_TIME 503, RSP_TYPE 504, and RSP_FILENAME 505 fields to indicate the mailbox number of the advertisement responded to, the date and time of the response, the format of the video file, and the location of the video file on the IWS. Finally, the field RSP_CONVERSION_FLAG 506 is set to TRUE for both record formats (AVI and VDOLive) in the Ad Database to indicate that the video file(s) does not need to be converted 1509.

Retrieving Responses Through a Telephone

Figure 13:
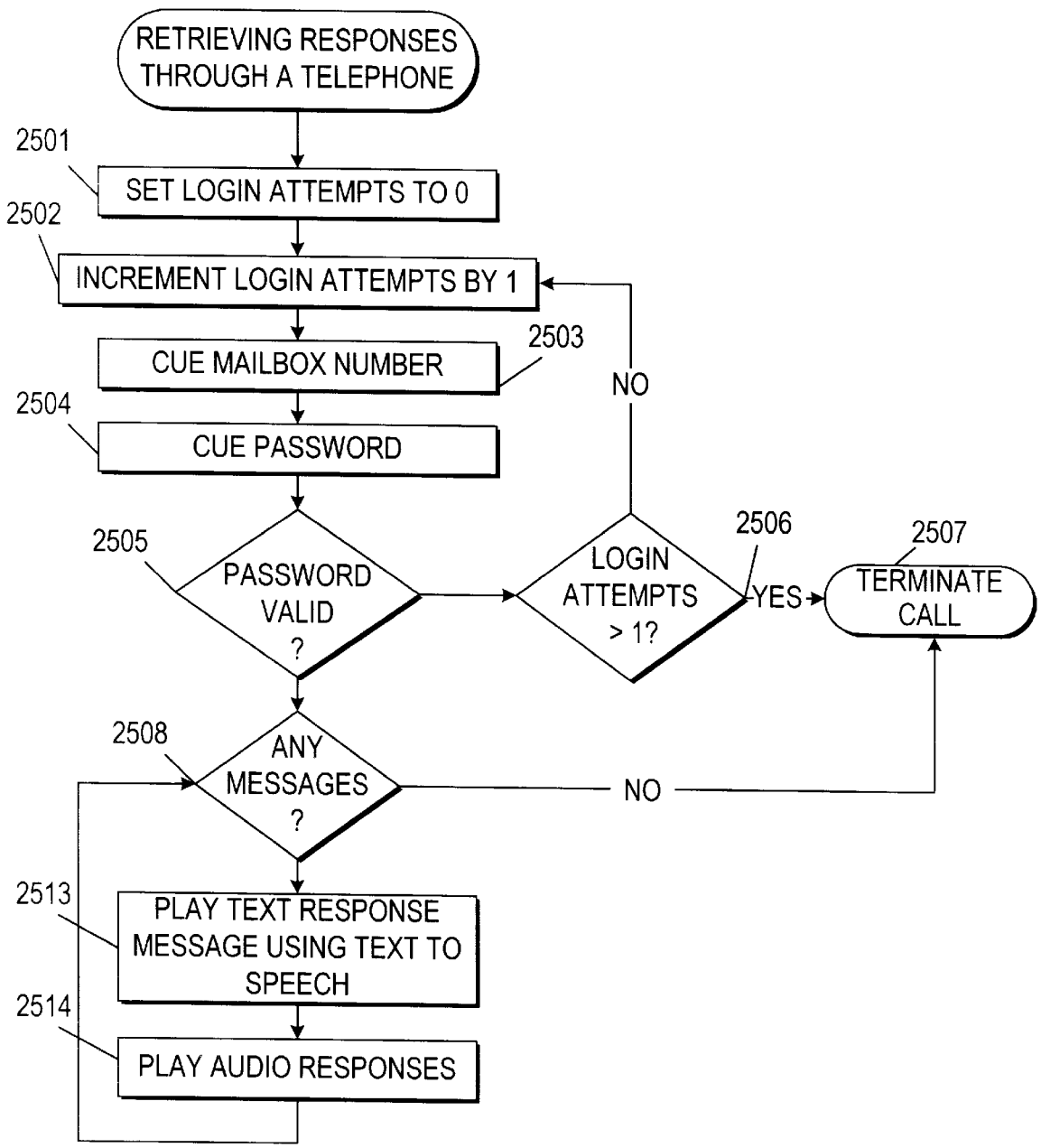
FIG. 13 shows a flow diagram of an exemplary operation of the process of retrieving responses through a telephone as accomplished by the present invention.

An exemplary operation of the system with regard to an advertiser retrieving responses to his personal advertisement will now be treated to accomplish the process as indicated in FIG. 13. First, suppose an advertiser at terminal T1 places a call to retrieve messages left in response to his advertisement. The assumed call involves the advertiser actuating the buttons to input the number 1-9-0-0-7-7-7-4-4-4-4, for example. As a result, signals are provided to the PTN resulting in a connection from the remote terminal T1 to the IVR. Using standard DNIS techniques, the IVR associates the called number 1 900 777 4444 with a specific format, for example, a message retrieval format.

Referring to FIG. 13, upon receiving a call, the IVR sets the "logon attempts" equal to zero 2501. The IVR then increments the "logon attempts" by one 2502 and cues the caller for a mailbox number 2503 and password 2504. The IVR then queries the Ad Database to determine if the mailbox number and password are valid 2505. If the entries are not valid, the IVR determines if the caller has exceeded the maximum number of logon attempts allowed 2506. If the caller has exceeded the maximum number of logon attempts allowed, the call is terminated 2507. If the maximum number of logon attempts allowed has not been exceeded, the IVR increments the "logon attempts" by one 2502 and again cues the caller for a mailbox number 2503 and password 2504.

If the entries are valid, the IVR then queries the AD_RESPONSE_TABLE to determine if the advertiser has any responses messages 2508. If the advertiser has no response messages, the call is terminated 2507. If the IVR finds a response, the IVR plays the text 2513 and audio 2514 messages from the respondent. If a response is in text form, the IVR uses text-to-speech to play the message. If there are additional responses, the caller is returned to block 2513. Otherwise, the call is terminated 2507.

Retrieving Messages Through the Internet

Figure 14:
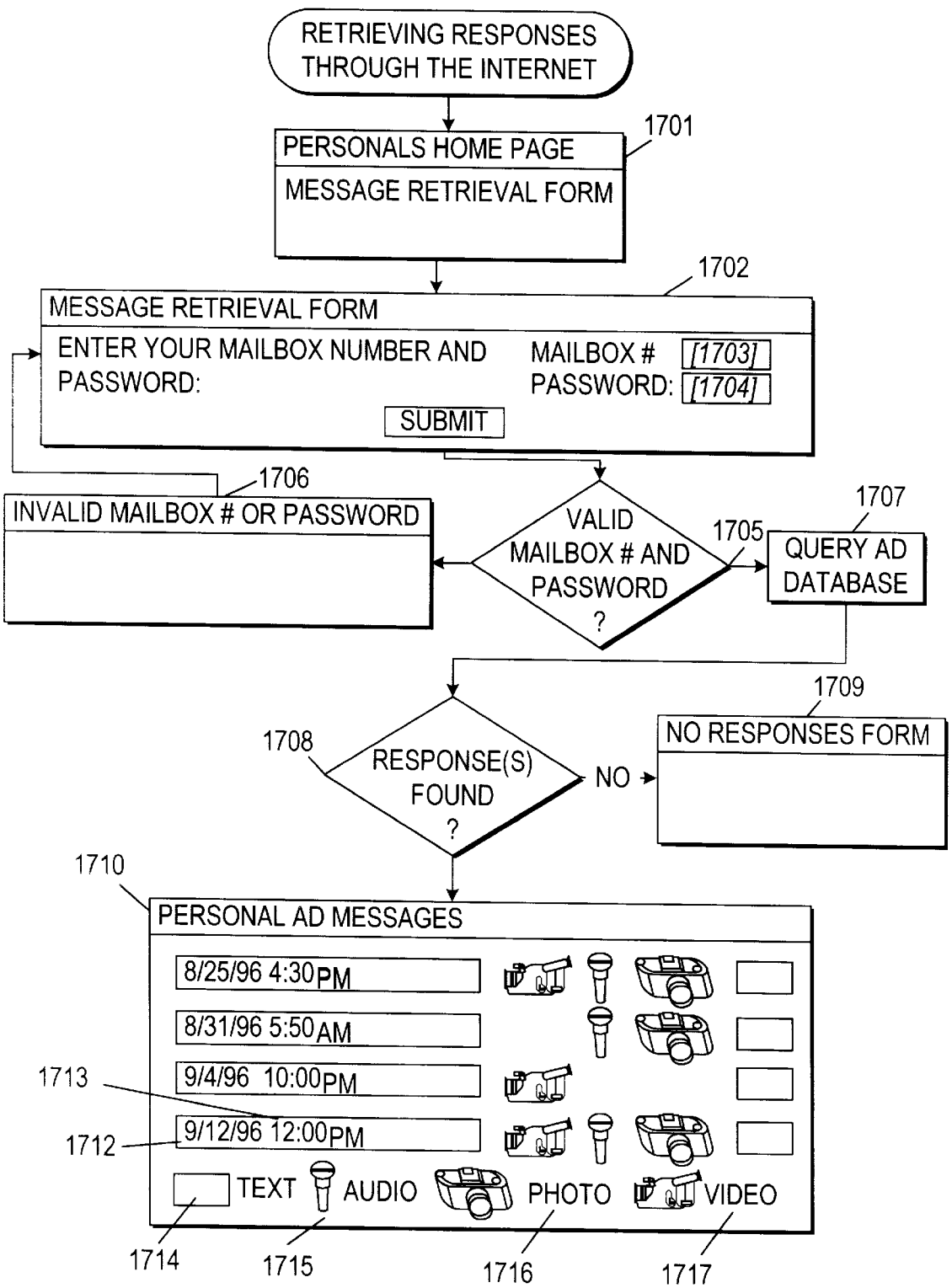
FIG. 14 shows a flow diagram of an exemplary operation of the process of retrieving responses through the Internet as accomplished by the present invention.

An exemplary operation of the system, with regard to an advertiser retrieving her messages via the Internet will now be treated to accomplish the process as indicated in FIG. 14. First, suppose an advertiser at terminal CT1 connects to the Internet to retrieve messages. The assumed Internet user connects to the Internet and inputs a URL, for example: http://www.personal_ads.com, resulting in a connection from the remote terminal CT1 to a Home Page 1701 on the IWS.

Referring to FIG. 14, from the Home Page 1701 on the IWS, the advertiser selects a Message Retrieval Form 1702. The Message Retrieval Form 1702 instructs the advertiser to enter a mailbox number 1703 and password 1704. The IWS then queries the Ad Database to determine if the mailbox number and password are valid 1705. If the entries are not valid, the Internet user is presented with an Invalid Mailbox and Password Form 1706. If the entries are valid 1705, the IWS queries the Ad Database 1707 to find responses to the advertiser's ad.

If there are no responses, the IWS presents the advertiser with a No Responses Form 1709. If the IWS finds one or more responses, the IWS presents the advertiser with a Personal Ad Messages Form 1710. The Personal Ad Messages Form 1709 shows any messages that were stored for the advertiser. Each message shows the date 1712 and time 1713 the message was received and contains one or more icons that represent the contents of the message. A text icon 1714 denotes a text message; an audio icon 1715 denotes an audio message; a still camera icon 1716 denotes a photograph; a video camera icon 1717 denotes a video clip. By clicking on an icon, the advertiser can view or listen to the associated file.

Psychographic Profiling Via Telephone

Figure 15:
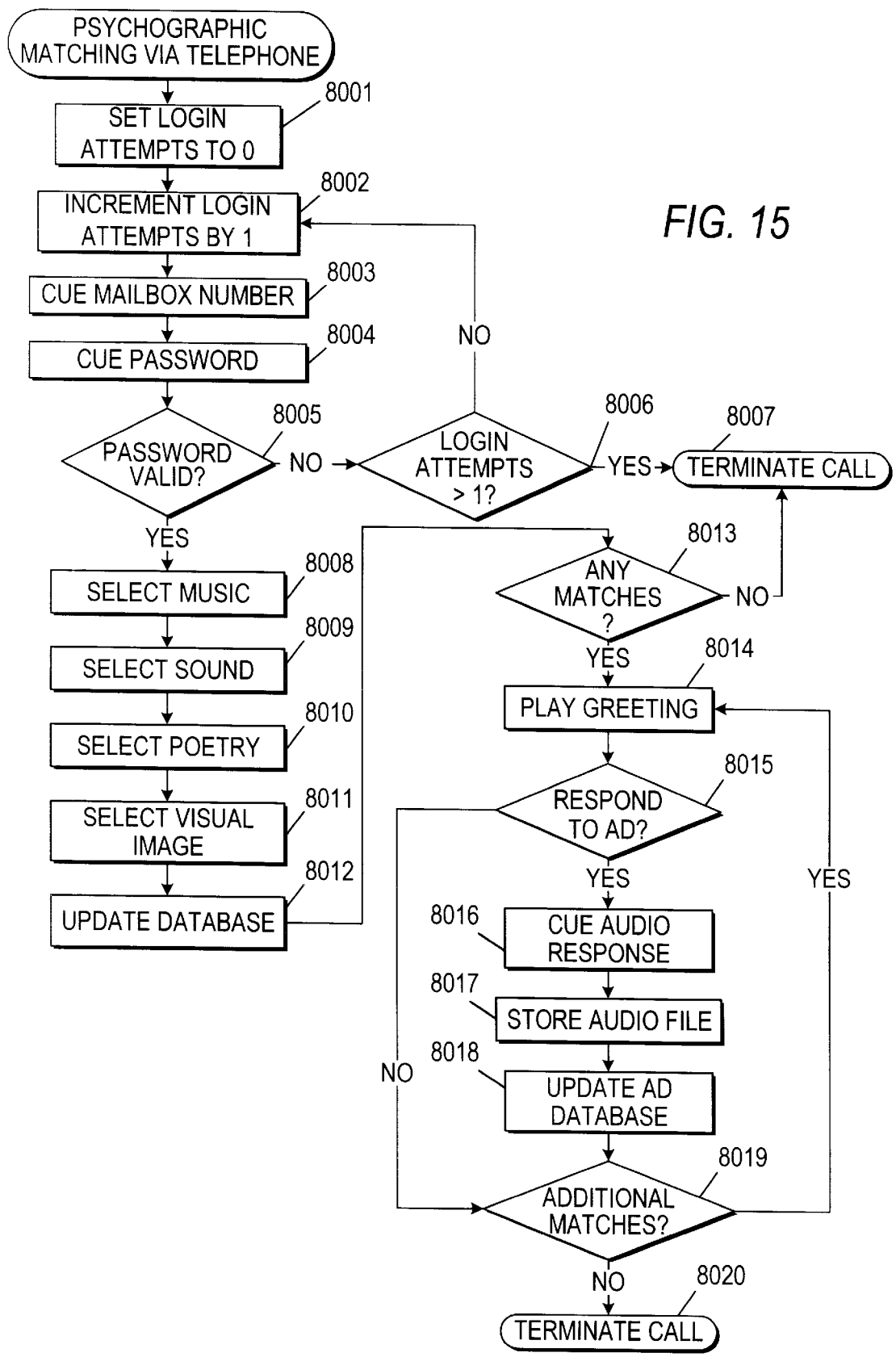
FIG. 15 shows a flow diagram of an exemplary operation of the process of psychographic matching via a telephone as accomplished by the present invention.

An exemplary operation of the system with regard to psychographic profiling will now be treated to accomplish the process as indicated in FIG. 15. First, suppose a telephone caller at terminal T1 places a call to find other advertisers whose subjective makeup and preferences, or "psychographic" profile matches his own. The assumed call involves the advertiser actuating the buttons to input the number 1-9-0-0-7-7-7-4-4-4-4, for example. As a result, signals are provided to the public telephone network resulting in a connection from the remote terminal T1 to the IVR. Using standard DNIS techniques, the IVR associates the called number 1-9-0-0-7-7-7-4-4-4-4 with a specific format, for example, a psychographic profiling format.

Referring to FIG. 15, upon receiving a call, the IVR sets the "logon attempts" equal to zero 8001. The IVR then increments the "logon attempts" by one 8002 and cues the caller for a mailbox number 8003 and password 8004. The IVR then queries the Ad Database to determine if the mailbox number and password are valid 8005. If the entries are not valid, the IVR determines if the caller has exceeded the maximum number of logon attempts allowed 8006. If the caller has exceeded the maximum number of logon attempts allowed, the call is terminated 8007. If the maximum number of logon attempts allowed has not been exceeded, the IVR increments the "logon attempts" by one 8002 and again cues the caller for a mailbox number 8003 and password 8004.

If the entries are valid, the caller is prompted to create his psychographic profile. The following is an illustrative embodiment of the creation of a psychographic profile. The IVR first plays two excerpts of music. The caller is asked to indicate his preference by pressing the "one" key if he prefers the first selection or the "two" key if he prefers the second selection 8008. Next, the caller is played two recordings of environmental sounds. The caller is asked to indicate his preference by pressing the "one" key if he prefers the first sound selection or the "two" key if he prefers the second selection 8009. The caller is then read two brief poetry selections. The caller is asked to indicate his preference by pressing the "one" key if he prefers the first selection or the "two" key if he prefers the second selection 8010. Finally, the caller is referred to the newspaper where two visual images are published. The caller is asked to press the "one" key if he prefers the first visual image or the "two" key if he prefers the second visual image 8011. The callers answers to these questions are then recorded in the Ad Database in the field AD_PSYCH_PROFILE 213. It is to be understood that the these psychographic profile questions are merely illustrative. The actual questions could vary greatly in both number and kind. The callers responses are then stored in the Ad Database in the field AD_PSYCH_PROFILE 8012.

Next, the IVR queries the Ad Database for ads of existing advertisers who have the same or a similar psychographic profile 8013. If there are no matches, the call is terminated 8007. Optionally, if there are no exact matches, a feature may be included whereby the caller could then select the 5, 10, 20, etc. closest matches. On the other hand, if the IVR finds a match, the IVR plays the greeting of the matching advertiser 8014. If the greeting is in text form, the IVR uses text to speech to play the message. The IVR then prompts the caller to indicate if he wishes to respond to the advertisement 8015.

If the caller elects not to respond to the advertisement and there are no additional matches, the call is terminated 8020. If the caller elects not to respond to the advertisement and there are additional matches, the caller is returned to block 8014.

If the caller elects to respond to the advertisement, the IVR next cues him to record his response 8016. The IVR then stores the response to a disk file 8017 and updates the Ad Database 8018. Specifically, the IVR creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the advertisement responded to, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR creates a new RealAudio .RA file from Dialogic .VOX file and stores the RealAudio file to a disk file on the IWS and updates the database. Specifically, the IVR creates a new record in the AD_RESPONSE_TABLE (see FIG. 4) and populates the fields RSP_MAILBOX_NUMBER 501, RSP_DATE_TIME 503, RSP_TYPE 504, and RSP_FILENAME 505 to indicate the mailbox number of the advertisement responded to, the date and time of the response, the format of the response, and the location of the response file on the IVR. The field RSP_TYPE 504 is set to RA to indicate that the audio recording is in the RealAudio .RA file format.

Finally, the field RSP_CONVERSION_FLAG 506 is set to TRUE for both the audiotext .VOX file and the RealAudio .RA file to indicate that the audio files do not need to be converted.

If there are additional matches, the caller is returned to block 8014. Otherwise, the call is terminated 8020.

Psychographic Profiling Via the Internet

Figure 16:
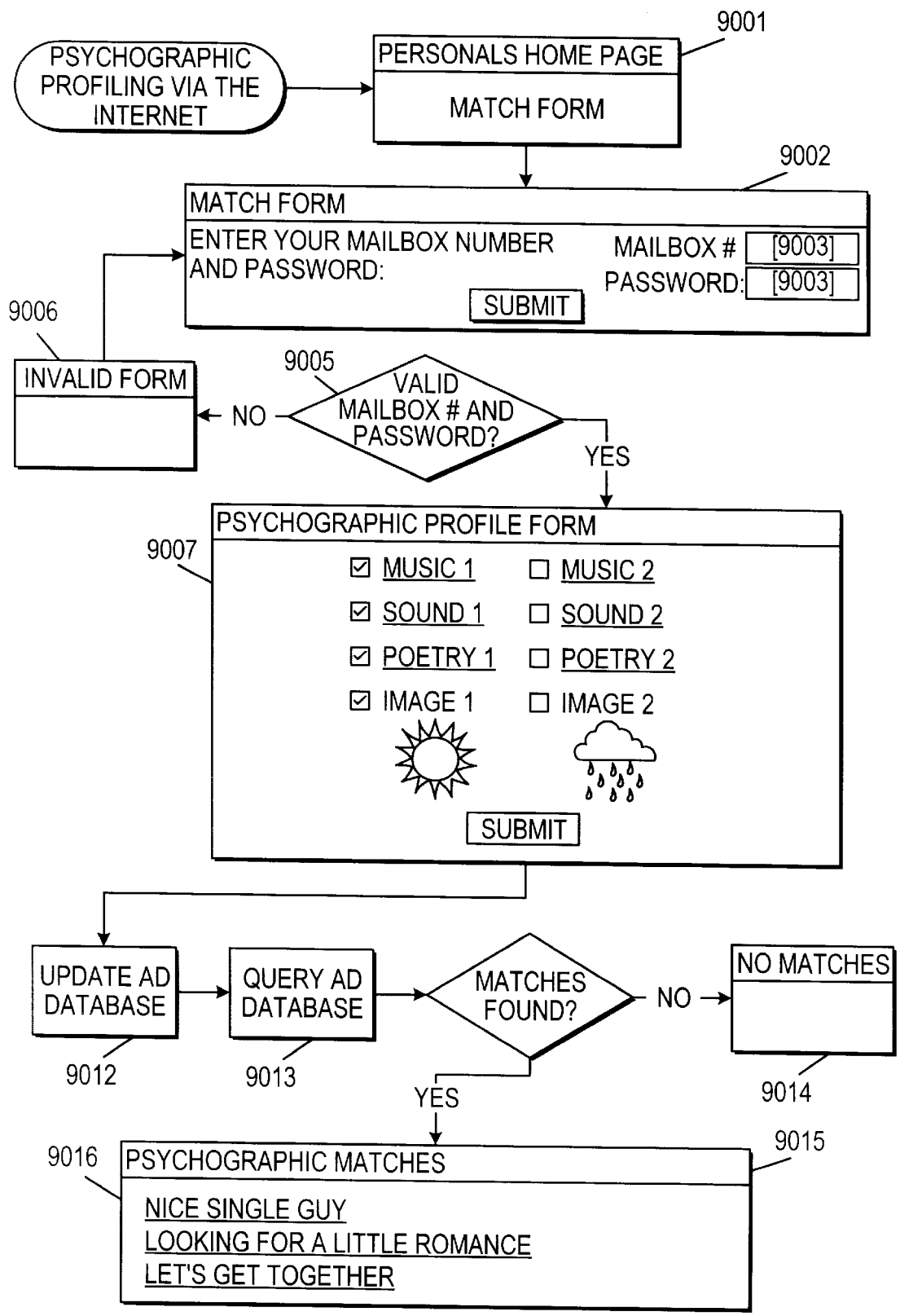
FIG. 16 shows a flow diagram of the psychographic profiling process, including the Psychographic Profile Form which provides the options for the Internet user to choose from in order to create the user's psychographic profile.

An exemplary operation of the system with regard to psychographic profiling via the Internet will now be treated to accomplish the process as indicated in FIG. 16. First, suppose an advertiser at terminal CT1 connects to the Internet to find existing advertisements that match her psychographic profile. The assumed advertiser connects to the Internet and inputs a Uniform Reference Locator URL, for example: http://www.personal_ads.com, resulting in a connection from the remote terminal CT1 to a Home Page 9001 the Internet Web Server.

Referring to FIG. 16., from the Home Page 9001 on the Internet Web Server, the Internet user selects a Match Form 9002. The Match Form 9002 instructs the advertiser to enter a mailbox number 9003 and password 9004. Upon submitting the input, the IWS queries the Ad Database to determine if the mailbox number and password are valid 9005. If the entries are not valid, the Internet user is presented with an Invalid Mailbox and Password Form 9006. If the entries are valid, the advertiser is passed to a Psychographic Profile page where she is instructed to create her psychographic profile. The advertiser first plays two experts of music by selecting the corresponding music hyperlinks. The advertiser indicates her preference by filling in the appropriate check box 9008. Next, the advertiser plays two recordings of environmental sounds by selecting the sound hyperlinks. The advertiser indicates her preference by filling in the appropriate check box 9009. The caller then plays two poetry selections by selecting the poetry hyperlinks. The advertiser again indicates her preference by filling in a check box 9010. Finally, the advertiser selects a preferred visual image by filling in its corresponding check box 9011. The advertiser then submits her selections, which are in turn recorded in the Ad Database in the field AD_PSYCH_PROFILE 9012. It is to be understood that these psychographic profile questions are merely illustrative. The actual questions could vary greatly in both number and kind.

Next, the IWS queries the Ad Database to find the advertisements of other advertisers who have the same or a similar psychographic profile 9013. If the query does not find any matching ads, the advertiser is presented with a No Matches Page 9014. Optionally, if there are no exact matches, a feature may be included whereby the caller could then be presented with a page listing the 5, 10, 20, etc., closest matches. On the other hand, if the query finds one or more matching advertisers, the IWS presents the advertiser with a Psychographic Matches form 9015. This Psychographic Matches form shows the user with a brief description, including a headline of the matching advertiser or advertisers, presented one at a time. Specifically, the Psychographic Matches form shows the advertisements titles or headline of each matching advertiser 9016. Each advertiser's title is a hyperlink that can be followed to the actual advertisement for viewing and responding.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A method for providing an electronic communications system for use with the Internet, said method comprising the steps of:

receiving an audio recording via the Internet;

storing said audio recording;

playing said audio recording via the Internet;

publishing a visual image on the Internet;

a first user indicating a preference for said visual image via the Internet;

a second user indicating a preference for said visual image via the Internet;

comparing said preference of said first user with said preference of said second user;

receiving an audio response message via the Internet; and retrieving said audio response message via the Internet;

wherein said audio recording is received from said first user.

2. A method for providing an electronic communications system for use with the Internet, said method comprising the steps of:

receiving an audio recording via the Internet;

storing said audio recording;

playing said audio recording via the Internet;
publishing a visual image on the Internet;
a first user indicating a preference for said visual image via the Internet;
a second user indicating a preference for said visual image via the Internet;
comparing said preference of said first user with said preference of said second user;
receiving a video response message via the Internet; and
retrieving said video response message via the Internet;
wherein said audio recording is received from said first user.

3. A method for providing an electronic communications system for use with the Internet, said method comprising the steps of:
receiving a video recording via the Internet;
storing said video recording;
playing said video recording via the Internet;
publishing a visual image on the Internet;
a first user indicating a preference for said visual image via the Internet;
a second user indicating a preference for said visual image via the Internet;
comparing said preference of said first user with said preference of said second user;
receiving an audio response message via the Internet; and
retrieving said audio response message via the Internet;
wherein said audio recording is received from said first user.

4. A method for providing an electronic communications system for use with the Internet, said method comprising the steps of:
receiving a video recording via the Internet;
storing said video recording;
playing said video recording via the Internet;
publishing a visual image on the Internet;
a first user indicating a preference for said visual image via the Internet;
a second user indicating a preference for said visual image via the Internet;
comparing said preference of said first user with said preference of said second user;
receiving a video response message via the Internet; and
retrieving said video response message via the Internet;
wherein said audio recording is received from said first user.

5. A method for providing an electronic communications system for use with the Internet, said method comprising the steps of:
a first user playing an audio recording via the Internet;
said first user indicating a preference for said audio recording via the Internet;
a second user playing said audio recording via the Internet:
said second user indicating a preference for said audio recording via the Internet;
comparing said preference of said first user with said preference of said second user;
receiving an audio response message via the Internet; and
retrieving said audio response message via the Internet.

6. A method for providing an electronic communications system for use with the Internet, said method comprising the steps of:
a first user playing an audio recording via the Internet;
said first user indicating a preference for said audio recording via the Internet;
a second user playing said audio recording via the Internet:
said second user indicating a preference for said audio recording via the Internet;
comparing said preference of said first user with said preference of said second user;
receiving a video response message via the Internet; and
retrieving said video response message via the Internet.

7. A method for providing an electronic communications system for use with the Internet, said method comprising the steps of:
a first user playing an audio recording via the Internet;
said first user indicating a preference for said audio recording via the Internet;
a second user playing said audio recording via the Internet:
said second user indicating a preference for said audio recording via the Internet;
comparing said preference of said first user with said preference of said second user;
receiving a second audio recording from said first individual via the Internet; and
is retrieving said second audio recording via the Internet;
wherein said second audio recording describes said first user.

8. A method for providing an electronic communications system for use with the Internet, said method comprising the steps of:
a first user playing a video recording via the Internet;
said first user indicating a preference for said video recording via the Internet;
a second user playing said video recording via the Internet;
said second user indicating a preference for said video recording via the Internet;
comparing said preference of said first user with said preference of said second user;
receiving an audio response message via the Internet; and
retrieving said audio response message via the Internet.

9. A method for providing an electronic communications system for use with the Internet, said method comprising the steps of:
a first user playing a video recording via the Internet;
said first user indicating a preference for said video recording via the Internet;
a second user playing said video recording via the Internet;
said second user indicating a preference for said video recording via the Internet;
comparing said preference of said first user with said preference of said second user;
receiving a video response message via the Internet; and
retrieving said video response message via the Internet.

10. A method for providing an electronic communications system for use with the Internet, said method comprising the steps of:
a first user playing a video recording via the Internet;
said first user indicating a preference for said video recording via the Internet;

a second user playing said video recording via the Internet;

said second user indicating a preference for said video recording via the Internet;

comparing said preference of said first user with said preference of said second user;

receiving an audio recording from said first individual via the Internet; and retrieving said audio recording via the Internet;

wherein said audio recording describes said first user.

11. A method for providing an electronic communications system for use with the Internet, said method comprising the steps of:

providing a link to a multimedia object via the Internet;

accessing said multimedia object by a first user;

said first user finding a second user based on said second user's association with said multimedia object;

said first user playing a video recording of said second user via the Internet; and sending an audio recording to said second user;

wherein said audio recording is retrieved via the Internet.

12. A method for providing an electronic communications system for use with the Internet, said method comprising the steps of:

providing a link to a multimedia object via the Internet;

accessing said multimedia object by a first user;

said first user finding a second user based on said second user's association with said multimedia object;

said first user playing a video recording of said second user via the Internet; and sending a second video recording to said second user;

wherein said second video recording is retrieved via the Internet.

13. A method for providing an electronic communications system for use with the Internet, said method comprising the steps of:

accessing a multimedia object by a first user via the Internet;

said first user finding a second user based on said second user's association with said multimedia object;

said first user displaying a picture of said second user via the Internet; and sending a audio recording to said second user;

wherein said audio recording is retrieved via the Internet.

14. A method for providing an electronic communications system for use with the Internet, said method comprising the steps of:

accessing a multimedia object by a first user via the Internet;

said first user finding a second user based on said second user's association with said multimedia object;

said first user displaying a picture of said second user via the Internet; and sending a second video recording to said second user;

wherein said second video recording is retrieved via the Internet.

* * * * *